US006771827B1

(12) United States Patent
Curry

(10) Patent No.: US 6,771,827 B1
(45) Date of Patent: Aug. 3, 2004

(54) SYSTEM AND METHOD FOR DIRECTED ACUITY SEGMENTATION RESOLUTION COMPRESSION AND DECOMPRESSION

(75) Inventor: Douglas N. Curry, Menlo Park, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/219,850

(22) Filed: Dec. 23, 1998

(51) Int. Cl.[7] .............................................. G06K 9/46
(52) U.S. Cl. ........................ 382/239; 382/232; 382/233
(58) Field of Search ................................ 382/232, 239, 382/266, 218, 245, 236, 237, 238, 233, 240, 246, 247, 248, 250; 358/448, 426, 429; 348/400.1

(56) References Cited

U.S. PATENT DOCUMENTS

| 4,558,370 A | * | 12/1985 | Mitchell et al. ............ 358/429 |
| 4,730,215 A | | 3/1988 | Jose et al. .................. 358/140 |
| 4,811,108 A | * | 3/1989 | Numakura et al. ......... 358/298 |

(List continued on next page.)

FOREIGN PATENT DOCUMENTS

| DE | 0584966 A1 | 7/1993 | .......... G06K/15/02 |
| DE | 0720918 A2 | 7/1996 | ........... B41J/2/205 |
| EP | 0 654 937 A2 | 5/1994 | ............ H04N/1/40 |
| EP | 0 856 988 A2 | 8/1998 | ............ H04N/1/41 |
| JP | 1052909 | 2/1998 | .............. B41J/2/01 |
| JP | 2000-194851 A | 7/2000 | ............. G06T/7/00 |

OTHER PUBLICATIONS

Lacroix, "A Three–Module Strategy for Edge Detection", IEEE Transactions on Pattern Analysis and Machine Intelligence vol. 10, No. 6, Nov. 1988, pps. 803–810.*

"Xerox Disclosure Jornal", vol. 8, No. 4, Jul./Aug. 1983 by Ronald G. Matteson, *A Guaranteed Data Compression Technique For Pictorial Inputs.*

"The Bell System Technical Journal" vol. 62, No. 9, Nov. 1983 by H. Gharavi and A. N. Netravali, *CITT Compatible Coding of Multilevel Pictures.*

"IEEE Transactions on Communications" 39 (1991) Aug., No. 8, New York, by Panos Nasiopoulos, Rabab K. Ward, and Daryl J. Morse, *Adaptive Compression Coding.*

*Primary Examiner*—Anh Hong Do
(74) *Attorney, Agent, or Firm*—Oliff & Berridge, PLC

(57) ABSTRACT

A compression and decompression system and process for optimally compressing and decompressing multibit per pixel image regions based on the type of data contained in the image region, e.g., whether the image region contains continuous tone data, including data to be halftoned, or non-continuous tone data, including antialiased text and lineart data. Segmented bytemap data blocks are processed to provide both low spatial resolution continuous tone data and high spatial resolution non-continuous tone data. However, the high spatial resolution non-continuous tone data is generated by quantizing and packing the high resolution bytes across an edge and discarding the high resolution bytes along the edge, i.e., the multibit data is discarded only in directions parallel to the edges of marks to be rendered in the image data. Additional information indicating the directions of the edges in the image data are stored to aid in decompression. Subsequently, during decompression, the non-continuous tone data is decompressed into a high spatial resolution bytemap by unpacking the high resolution across the edges and inferring the high resolution along the edges. The low spatial resolution continuous tone data are processed to provide a low spatial resolution continuous tone data bytemap. As a result of this compression and decompression method, the amount of memory necessary to store the non-continuous tone data is reduced to a quarter of the memory necessary to store a conventional high spatial resolution bytemap.

48 Claims, 26 Drawing Sheets

U.S. PATENT DOCUMENTS

| | | | | |
|---|---|---|---|---|
| 5,247,363 A | * | 9/1993 | Sun et al. | 358/167 |
| 5,293,430 A | | 3/1994 | Shiau et al. | 382/42 |
| 5,341,226 A | | 8/1994 | Shiau | 358/518 |
| 5,442,458 A | * | 8/1995 | Rabbani et al. | 358/426 |
| 5,485,289 A | | 1/1996 | Curry | 358/448 |
| 5,761,341 A | | 6/1998 | Go | 382/232 |
| 5,774,634 A | * | 6/1998 | Honma et al. | 358/1.9 |
| 5,832,115 A | * | 11/1998 | Rosenberg | 382/199 |
| 5,872,868 A | * | 2/1999 | Curry | 382/266 |
| 6,005,978 A | * | 12/1999 | Garakani | 382/218 |
| 6,026,196 A | | 2/2000 | Shannon et al. | 382/237 |
| 6,167,150 A | | 12/2000 | Michael et al. | 382/149 |
| 6,212,303 B1 | * | 4/2001 | Doran et al. | 382/245 |
| 6,229,578 B1 | | 5/2001 | Acharya et al. | 348/607 |
| 6,307,962 B1 | | 10/2001 | Parker et al. | 382/170 |
| 6,389,176 B1 | * | 5/2002 | Hsu et al. | 382/254 |

* cited by examiner 400 ppi pixel E   400 ppi pixel F

QUADRANT I (BYTE P')  QUADRANT II (BYTE Q')

QUADRANT III (BYTE R')  QUADRANT IV (BYTE S')

400 ppi pixel G  400 ppi pixel H

|  | LSTPTR+2 | SRCPTR+2<br>BYTE Q'<br><br>*QUAD.II* | NXTPTR+2<br>BYTE S'<br><br>*QUAD.IV* |
|---|---|---|---|
| | LSTPTR<br>BYTE U' | SRCPTR<br>BYTE P'  A  B *QUAD.I*<br>                C  D | NXPTR<br>BYTE R'<br><br>*QUAD.III* |
| | LSTPTR-2 | SRCPTR-2<br>BYTE V' | NXTPTR-2 |

*FIG. 4*

*FIG. 12*
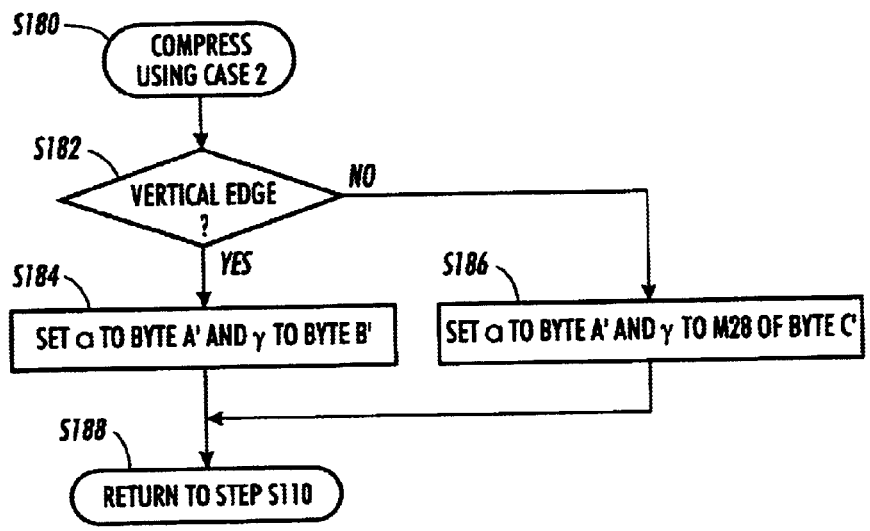
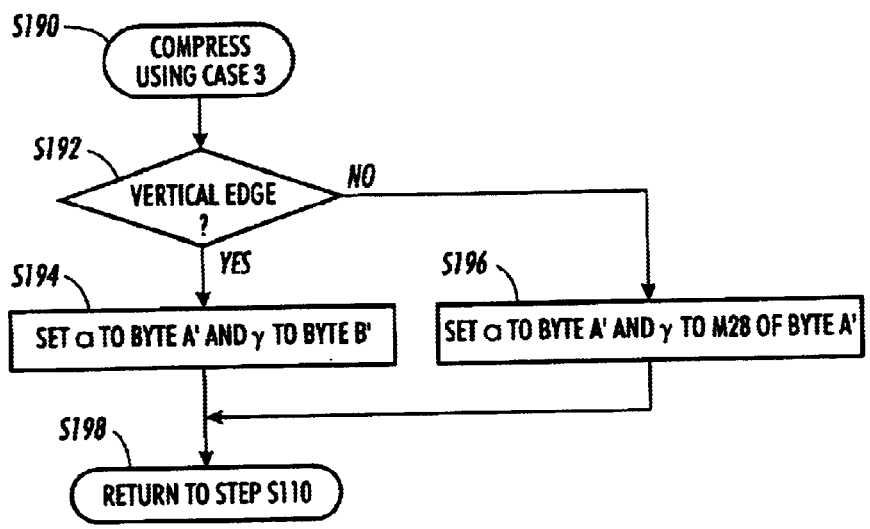
*FIG. 13*

*FIG. 16*
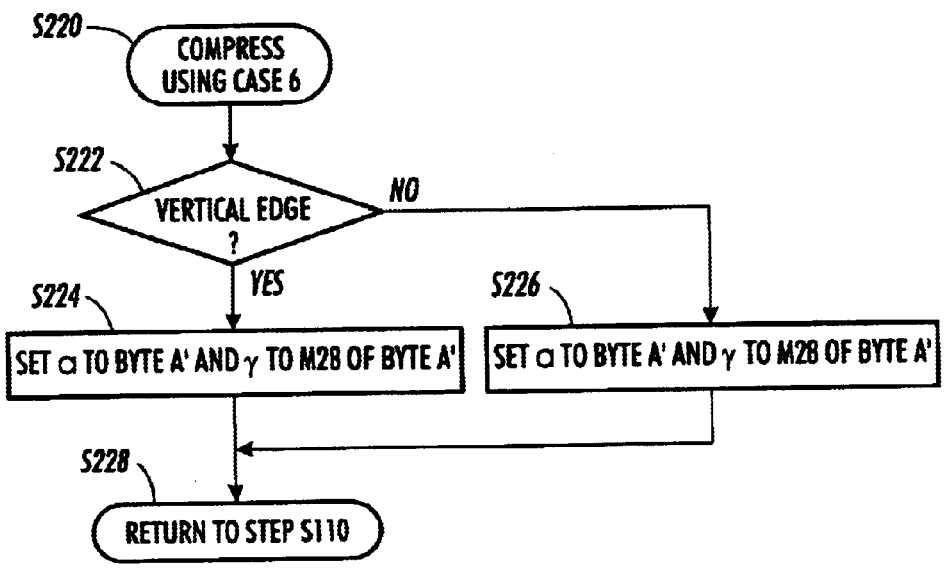
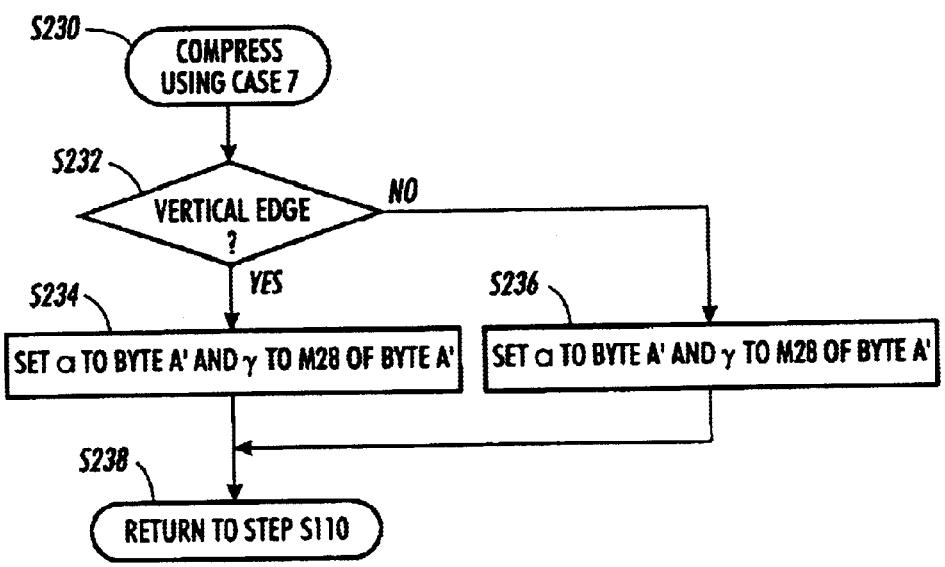
*FIG. 17*

FIG. 18
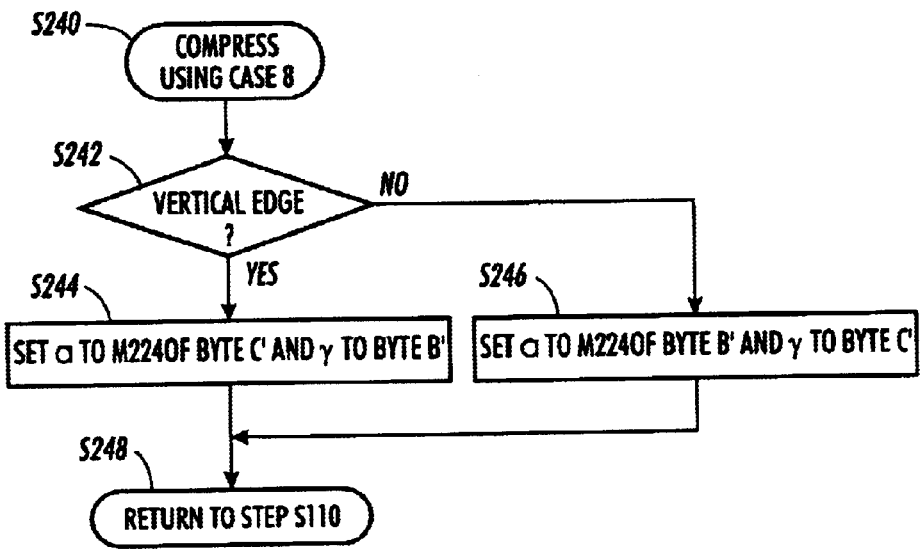
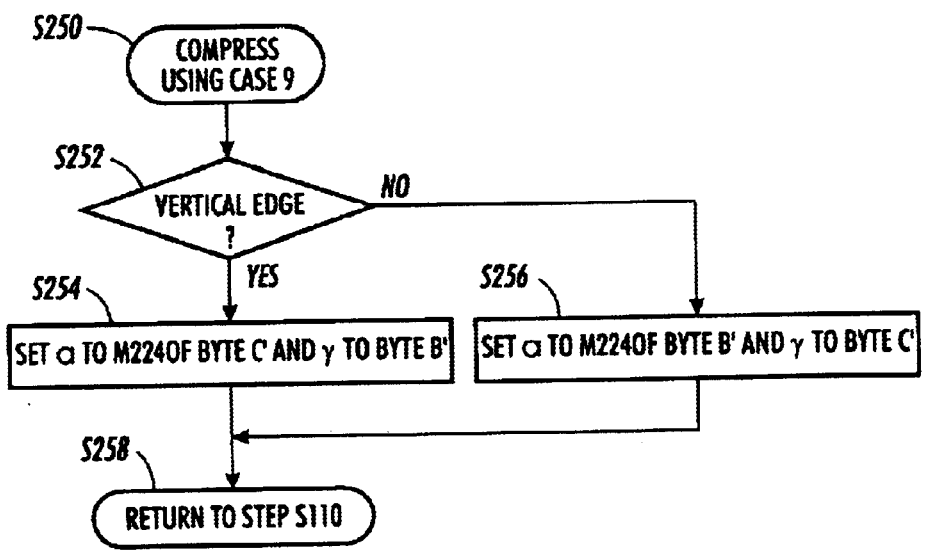
FIG. 19

SYSTEM AND METHOD FOR DIRECTED ACUITY SEGMENTATION RESOLUTION COMPRESSION AND DECOMPRESSION

This application includes Appendix A containing computer code that performs compression of image data in accordance with this invention and Appendix B containing computer code that performs decompression of image data in accordance with this invention.

A portion of the disclosure of this patent document contains material which is subject to (copyright or mask work) protection. The (copyright or mask work) owner has no objection to the facsimile reproduction by any-disclosure, as it appears in the Patent and otherwise Office patent file or records, but otherwise reserves all (copyright or mask work) rights whatsoever.

BACKGROUND OF THE INVENTION

1. Field of Invention

This invention relates generally to compression and decompression systems and methods. More specifically, this invention relates to compression and decompression systems and methods that compress and decompress image areas containing edges of marks to be rendered in image data based on the direction of the edges of the marks.

2. Description of Related Art

The human viewer appreciates viewing non-continuous toneart information, e.g., text and/or lineart, at higher spatial resolutions than the spatial resolutions required for continuous toneart information, e.g., halftone information, because the human eye sees contrast information at a higher spatial resolution than color information. Therefore, more spatial resolution is necessary to render non-continuous tone regions than is necessary to render continuous tone regions. This differentiation between the amount of information necessary for the human eye to process non-continuous tone regions and to process continuous tone regions is due to hyperacuity. Hyperacuity is the human visual system's ability to differentiate locally misaligned edges of marks in a rendered image to a much finer extent than the receptor spacing of the human eye. It is not the frequency response, i.e., resolution, of the visual system, but the ability to reckon edge position with high precision that is most important.

Data transmitted in a bytemap, i.e., one byte for each pixel of the image, typically has a corresponding spatial resolution that is roughly equal to the size of the pixel. Forming high quality continuous tone regions does not require as much spatial resolution for the transmitted data. However, continuous tone regions require a high number of tone levels to minimize contouring, or the ability of the visual system to see changes in tone. In contrast, forming extremely detailed non-continuous tone marks, such as three or four point text, requires a significant amount of spatial resolution for the transmitted image data, but generally requires fewer number of tone levels.

In this case, the non-continuous tone pixels are not necessarily binary, but can also be composed of a number of gray levels. The non-continuous tone data is of the type that might be scanned in from a high quality scanner, or of a type called antialiased, which contains partial intensities to help in the removal of stairstepping or the positioning of edges.

Therefore, in a bytemap, high spatial resolution, e.g., 800×800 pixels per inch (ppi) is necessary for non-continuous tone regions, while continuous tone regions only need low spatial resolution, e.g., 400×400 (ppi). Therefore, transmitting bytemapped image data with high spatial resolution results in an unnecessary degree of spatial resolution for rendering continuous tone data and a waste of image system resources to process the unnecessary data.

If bitmaps are used instead to transmit image data for printing, continuous tone data is sent as prehalftoned dot shapes. Sending proper pre-halftoned dots to a destination, e.g., a printer, requires a high spatial resolution, e.g., 600× 4800 ppi, to avoid contouring. However, 4800 pixels per inch resolution is too much resolution for non-continuous tone data.

Therefore, when using bitmaps, higher spatial resolution is necessary for rendering continuous tone data than is necessary for rendering non-continuous tone data, once again resulting in a waste of image system resources to process the unnecessary data.

SUMMARY OF THE INVENTION

Regardless of whether the bitmaps or bytemaps are used to render images, spatial resolution mismatch results because of the different requirements for rendering non-continuous tone data and continuous tone data. Nevertheless, conventionally, continuous tone data, e.g., halftone data, and non-continuous tone data, e.g., text and lineart data, are sent to a printer or associated hardware that convert bytemaps or bitmaps into scanning laser modulations at essentially the same spatial resolution.

Thus, this invention provides compression and decompression systems and processes for compressing and decompressing image data taking the resolution mismatch into consideration. In one exemplary embodiment of the compression and decompression systems and methods, regions of an image are optimally compressed and decompressed based on the composition of the regions, for example, whether the regions are continuous tone or non-continuous tone regions.

This invention separately provides compression and decompression systems and methods that at least double the spatial resolution for non-continuous tone data, while maintaining adequate spatial resolution for continuous tone data and minimizing the amount of memory and corresponding transmission bandwidth requirements.

The invention separately provides compression and decompression systems and methods for storing extra resolution in a frequency spatial resolution direction of non-continuous tone data to improve the appearance of an image rendered using the data.

The invention separately provides compression and decompression systems and methods that eliminate spatial resolution mismatch between data used to render continuous tone regions and data used to render non-continuous tone regions.

This invention separately provides compression and decompression systems and methods that provide the necessary information to provide high spatial resolution non-continuous tone data and low spatial resolution continuous tone data as compressed data.

The invention separately provides compression and decompression systems and methods that increase non-continuous tone data spatial resolution.

The invention separately provides compression and decompression systems and methods that render gray level information for two non-continuous tone pixels in a single byte.

The invention separately provides decompression systems and methods that typically double the spatial resolution of non-continuous tone data relative to the compressed data. That is, during compression, the compressed data is abbreviated in the high frequency spatial resolution direction, i.e., the directed acuity direction, which is the direction perpendicular to the edge.

According to the compression and decompression systems and processes of this invention, a bytemap is asymmetrically compressed and decompressed. During compression, either a low spatial resolution or high spatial resolution bytemap is divided into data blocks and segmented so that the continuous toneart data regions are separated from the non-continuous tone data regions. The segmented bytemap data is processed to provide both low spatial resolution continuous tone data and high spatial resolution non-continuous tone data.

Specifically, the high spatial resolution non-continuous tone data is compressed by quantizing and packing high resolution pixels in a direction across the edge, i.e., perpendicular to an edge of a mark to be rendered, and discarding high resolution pixels along the edge, i.e., parallel to the edge. Additional information, called tag bits, indicating the directions of the edges, e.g., vertical or horizontal directions, and the type of image data, e.g., continuous or non-continuous data, is also stored to enable decompression.

Subsequently, during decompression, the non-continuous tone data is decompressed into a high spatial resolution bytemap by unpacking the high resolution pixels across the edge, and inferring the high resolution pixels along the edge. The low spatial resolution continuous tone data are processed to provide a low spatial resolution continuous tone bytemap, which will later be halftoned.

As a result of compression and decompression systems and methods according to this invention, the amount of memory necessary to store the non-continuous tone data is reduced to a quarter of the memory necessary to store a conventional high spatial resolution bytemap. Corresponding improvements in bandwidth utilization accompany this reduction in memory requirements. As a result, the resolution mismatch present in conventional image rendering is eliminated because high spatial resolution bytemap data is provided for the non-continuous tone regions, while low spatial resolution bytemap data is provided for continuous tone regions without any waste of printer resources.

Accordingly, the compression and decompression systems and processes of this invention take into consideration whether a byte represents continuous tone data, or non-continuous tone data. During compression of non-continuous tone, two out of four high spatial resolution antialiased non-continuous tone pixels are discarded and the other two are compressed into a single byte.

The increased spatial resolution of the non-continuous tone data is beneficial because a 400 byte per inch (bpi) compressed data bytemap with high quality continuous tone data can produce non-continuous tone data at a spatial resolution of 800×800 bpi, for instance. This occurs because, when bytemaps are used, halftoning is performed and the printer and the quality of the halftone dots is stored in the printer.

In the compressed data according to the systems and method of this invention, only eight levels of gray are available for non-continuous tone data, as opposed to 128 levels of gray for the compressed continuous tone data. Although some measure of precision is lost by rendering the non-continuous tone regions using eight rather than 256 levels of gray, the loss in precision is negligible in comparison to the improved memory and printer resource utilization.

In this case, there is a two-fold compression in each direction, which is an overall four-fold two-dimensional compression.

This invention can be implemented with alternate quantizing and packing formatting, for instance quantizing to four or two (binary) levels of gray for the non-continuous tone levels, in which case even more compression would be possible. For example, four levels of gray are implemented with two bits, and three of these two-bit values can be packed into the same six bits that two three-bit values are stored. This would give a three-fold compression in one direction, or a nine-fold two-dimensional compression. Likewise, using binary values would provide a six-times compression in one direction, which is a thirty-six-fold 2-D compression.

Additionally, there are many possible pixel word lengths besides six bits (plus the two tag bits), which increases the permutations of possible compression formatting.

In one exemplary embodiment of the compression and decompression systems and methods, regions of an image are optimally compressed and decompressed based on the composition of the regions, for example, whether the regions are continuous tone or non-continuous tone regions.

In a first exemplary embodiment of the compression and decompression systems and methods of this invention, during compression, a high spatial resolution bytemap output from an image source is processed to provide high spatial resolution continuous tone data and high spatial resolution non-continuous tone data. During compression, three-quarters of the pixels identified as continuous tone data are discarded to produce low spatial resolution continuous tone data. Also, half of the pixels identified as non-continuous tone data are discarded, but only in the direction along the edge. Specifically, half of the non-continuous tone pixels are discarded in such a manner that high spatial resolution is maintained in the directions across edges of marks in the image, but low spatial resolution is provided in directions parallel to those edges. Therefore, low spatial resolution continuous tone data and one-dimensional high spatial resolution non-continuous tone data are produced.

Additionally, information regarding two pixels of non-continuous tone data are compressed into a single data word, e.g., a byte. However, information regarding only one pixel of continuous tone data is included in each byte of compressed image data. The memory necessary to store the non-continuous tone data is decreased to a quarter of the original memory because half of the pixels of the non-continuous tone data are discarded in the directions parallel to the edges and the data of two non-continuous tone data pixels is compressed into a single byte of image data. Corresponding improvements in bandwidth utilization accompany this reduction in the required memory.

The data corresponding to each of the two non-continuous tone pixels is contained in three-bits of data in the compressed data bytes. Therefore, six bits of a compressed data byte contain data corresponding to two non-continuous tone pixels. The remaining two bits of each compressed data byte are a segmentation bit, indicating whether the byte is continuous tone data or non-continuous tone data, and a direction bit, indicating the direction of an edge located between the pixel corresponding to the byte of data if the data is non-continuous tone data. This direction bit, in turn, indicates the direction of fabrication to be performed when decompressing the compressed data byte. Thus, each byte of compressed image data includes a segmentation bit that indicates whether the data stored in the byte is non-continuous tone data, or a continuous tone data. If the byte of compressed image data contains non-continuous tone data, the byte also includes the direction bit which classifies the direction of the edge located between the two pixels of that the byte.

During compression, the high spatial resolution non-continuous tone data is compressed into a high spatial resolution bytemap with extra resolution along the edges. The low resolution continuous tone data are processed to provide a low spatial resolution continuous tone bytemap. During decompression, the image values associated with the discarded pixels of non-continuous tone data are synthesized from the information in adjacent compressed data bytes. Specifically, discarded pixels can be inferred by interpolating in the direction along the edge between two adjacent non-continuous tone pixels.

In a second exemplary embodiment of the compression and decompression systems and methods of this invention, an image source produces low spatial resolution continuous tone data and high spatial resolution non-continuous tone data. The high spatial resolution non-continuous tone data is compressed in the same manner as in the first exemplary embodiment. The low spatial resolution continuous tone data does not need to be compressed. The resulting compressed non-continuous tone data is decompressed in the same manner as in the first embodiment to provide high spatial resolution non-continuous tone data. Similarly to the first exemplary embodiment, during decompression, the low spatial resolution continuous tone data is processed to provide low spatial resolution data.

In a third exemplary embodiment of the compression and decompression systems and method of this invention, an image source produces low spatial resolution continuous tone data. The image source also produces non-continuous tone data that has high spatial resolution only in directions across the edges. As a result, there is no need to increase a bytemap size by four times to provide twice as much resolution. Therefore, the process may use a bytemap that is a quarter the size of the bytemap that would otherwise be conventionally necessary to provide high spatial resolution non-continuous tone data. During the compression according to this third exemplary embodiment of the systems and methods of this invention, no pixels are discarded from the non-continuous tone data or the continuous tone data.

These and other features and advantages of this invention are described in or are apparent from the following detailed description of the systems and methods according to this invention.

BRIEF DESCRIPTION OF THE DRAWINGS

Further objects and advantages of this invention will be evident when the following detailed description is read in conjunction with the attached drawings, in which:

FIG. 4 illustrates the relationship between the quadrants and the pointers used during compression and decompression;

FIGS. 10–25 outline in greater detail exemplary embodiments of methods for compressing using cases 0–15, respectively, according to this invention;

DETAILED DESCRIPTION OF EXEMPLARY EMBODIMENTS

Figure 1:
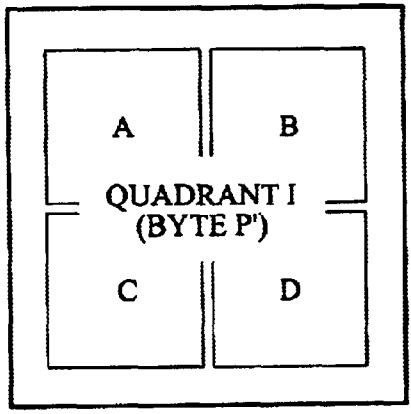
FIG. 1 illustrates the relationship between the bytes of compressed image data and the corresponding quadrants of uncompressed image data.
Figure 1:
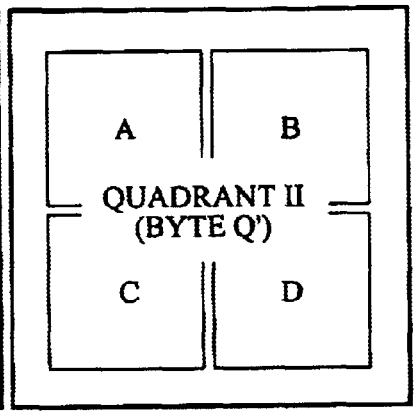
Figure 1:
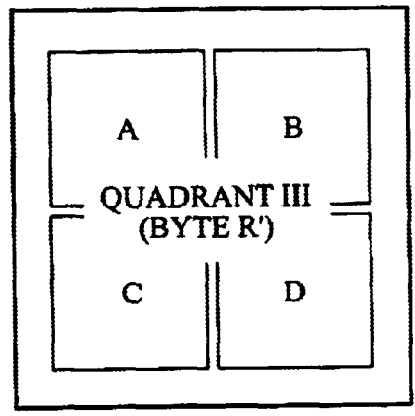
Figure 1:
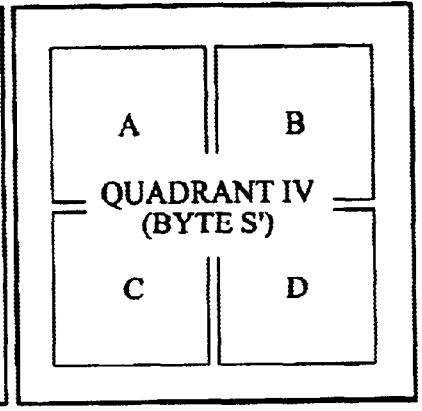

As discussed briefly above, conventionally, non-continuous tone data are rendered in the same manner as continuous tone data. Specifically, non-continuous tone data are rendered using 256 levels of gray represented with eight bits of data in the same way that continuous tone data are rendered. Non-continuous tone data are transmitted throughout the printer using the same identifying features even though 256 levels of gray are not necessary to adequately render non-continuous tone data.

However, as discussed above, this uniform process of transmitting both continuous tone data and non-continuous tone data inefficiently uses memory or, alternatively, produces poor image quality. Using bytemaps, rendering non-continuous tone data requires a higher spatial resolution than rendering continuous tone data. However, increased spatial resolution results in increased data storage requirements. For example, when increasing the spatial resolution from 400 ppi to 800 ppi, the memory necessary to store a bytemap at 800 ppi is $2^2$ or four times that of the memory necessary to store a bytemap at 400 ppi.

Therefore, the compression and decompression systems and methods of this invention differentiate between continuous tone data and non-continuous tone data. Differentiating between these data types allows compression and decompression to be tailored particularly to the information within the data necessary for printing the particular type of data.

The systems and methods of this invention are preferably practiced in conjunction with hyperacuity printing processes and systems, such as the processes and systems described in U.S. Pat. No. 5,485,289 to Douglas N. Curry, incorporated herein by reference in its entirety. Hyperacuity printing renders continuous tone data differently than non-continuous tone data. Hyperacuity printing renders edges that are one-dimensional objects. These objects require more local spatial resolution in a direction perpendicular to an edge than in a direction that is parallel to the edge, so that several parallel edges can be closely spaced together. These one-dimensional objects require less local spatial resolution in the direction parallel to the edges because changes to the image in that direction occur slowly.

A hyperacuity printer may use antialiased data for non-continuous tone data. The gradient information of antialiased data can be examined to precisely position edges between pixels and to eliminate stairstepping or jaggies. For a more detailed explanation of the nature and uses of antialiased data, see U.S. patent application Ser. No. 08/726,328 to Curry, incorporated herein by reference in its entirety. Experimental data indicates that only three or four bits of data per pixel are required to achieve an adequate antialiased quality for non-continuous tone data. Therefore, non-continuous tone pixels may be rendered using eight levels of gray, identified by three-bits, e.g., "000" to "111", rather than using 256 levels of gray using eight bits. As a result, data for rendering a non-continuous tone pixel can be included in a nibble, e.g., three-bits, that is packed along with another nibble, corresponding to another pixel and also including three-bits, into a single byte. By containing the information necessary to define two 800 ppi non-continuous tone pixels into each byte, the spatial resolution provided by the bytemap is doubled without using any extra memory. In the non-continuous tone byte, the remaining two bits include a direction bit and a segmentation bit.

The segmentation bit indicates whether the byte is continuous tone data or non-continuous tone data. The segmentation bit is provided as a result of any known or later developed technique for segmenting or dividing the image data into regions of different data types. Examples of this type of segmenting are described in U.S. Pat. Nos. 5,341,226 and 5,293,430, each incorporated herein by reference in their entirety.

The direction bit indicates the direction of an edge within the non-continuous tone data, e.g., the edge located between the pixels defined by the data nibbles. The direction bit thus indicates the direction in which data synthesis is performed using the information in the compressed non-continuous tone byte.

The two nibbles of image data within a non-continuous tone byte define the image values of the two 800 ppi pixels located across an edge from each other in a data quadrant. This is done because the spatial resolution in any two-dimensional image of non-continuous tone data is essentially only one-dimensional. High frequency spatial resolution occurs only in one direction, i.e., across the edge. In contrast, the spatial resolution in the other direction, i.e., along that edge, is quite low because the image values on each side of the edge generally do not change along the edge. Thus, undefined values of non-continuous tone 800 ppi pixels along an edge can be synthesized from values of explicitly-defined 800 ppi pixels that are adjacent to such undefined 800 ppi pixels along the edge. Therefore, there is a high probability that values of undefined 800 ppi pixels adjacent to a defined 800 ppi pixel in a low spatial resolution-direction, i.e., along the edge, will be the average of the two adjacent pixels.

As a result, in the exemplary embodiments of the compression and decompression systems and methods of this invention, when an antialiased bytemap is compressed, each compressed byte of non-continuous tone data includes a direction bit indicating the direction of the edge line between the explicitly defined, i.e., high spatial resolution, 800 ppi pixels. This direction is either vertical, to within +/−45° of 900, or horizontal, to within +/−45° of 0°. Providing a direction bit as an indication of horizontal or vertical direction provides enough information to a print engine to determine which the 800 ppi pixel positions are to be synthesized during decompression. By providing explicit data regarding twice as many 800 ppi pixels in the direction perpendicular to the edge, i.e., across the edge, the spatial resolution can be doubled with only twice the number of the 800 ppi pixels and no extra data bytes, instead of four times the number of the 800 ppi pixels and four times as many data bytes, as would be conventionally required. This occurs because the undefined 800 ppi pixels in the direction parallel to the edge, i.e., along the edge, can be synthesized using the information about the explicitly-defined 800 ppi pixels and additional information, e.g., the direction bit, the segmentation bit and values associated with other explicitly-defined and synthesized 800 ppi pixels that surround the 800 ppi pixels to be synthesized.

For example, when rendering a quadrant of image data containing a vertical edge, high frequency spatial resolution is necessary only in the horizontal direction. Therefore, two three-bit nibbles of a byte, i.e., six bits, are used to provide the necessary data to define two horizontally-adjacent 800 ppi pixels and to determine the gradient between the two horizontally-adjacent 800 ppi pixels in the horizontal direction to render the vertical edge. The gradient is used to determine the location of the edge within sub-scan precision, as discussed in the incorporated '289 patent. The 800 ppi pixels in the horizontal, e.g., fastscan, direction are explicitly defined, whereas the 800 ppi pixels in the vertical, e.g., slow-scan, direction are synthesized using the explicitly-defined image data for the horizontally-adjacent 800 ppi pixels and the additional information described above.

When rendering a horizontal edge, high frequency spatial resolution is necessary only in the vertical direction. Therefore, the two three-bit nibbles in the byte are used to provide the necessary bits for defining two vertically-adjacent 800 ppi pixels and determining the gradient between the two vertically-adjacent 800 ppi pixels in the vertical direction to render the horizontal edge, and to locate that horizontal edge at a subscan precision.

Continuous tone data are considered to be at a coarser resolution than non-continuous tone data, because non-continuous tone data requires more spatial resolution to precisely position edges for printing. However, the continuous tone data benefit from the maximum dynamic range afforded by the 256 levels of gray conventionally available. Therefore, during compression, the coarser continuous tone data remain essentially unchanged. That is, each continuous tone data byte uses seven bits to encode maximum dynamic range. The eighth bit is then used to indicate that the byte is continuous tone data. The full byte of continuous tone data is then used to drive the printer at enough different gray levels, in this case, 128 gray levels, to accurately render the image.

Following compression, the compressed image data is ultimately transmitted to a print engine where the compressed non-continuous tone image data is decompressed into half the 800 ppi pixels necessary for high spatial resolution. The decompression systems and methods of this invention use the segmentation bit to determine whether a compressed image byte contains continuous tone data or non-continuous tone data. If the compressed image byte is a non-continuous tone byte, the decompression systems and methods use the direction bit to determine the high spatial resolution direction and synthesize 800 ppi pixels in the low spatial resolution direction. Along with the three-bit nibble, explicitly-defined two 800 ppi pixels, extra 800 ppi pixels are synthesized from each non-continuous tone data byte during decompression to provide pixels in the low-spatial resolution direction from 400 ppi resolution to 800 ppi resolution. At the same time, if the compressed image byte is continuous tone data, the decompression systems and methods either replicate this 400 ppi continuous tone image data byte into the adjacent 800 ppi pixels or average this 400 ppi continuous tone image data byte with adjacent 400 ppi continuous tone image data sufficient to provide image data sufficient to fill in the 800 ppi grid.

Continuous tone bytes can be indicated by, for example, a segmentation bit with a value of 1. The exemplary embodiment of the compression method of this invention set forth in the attached Appendix A identifies continuous tone data bytes using a segmentation bit having a value of 1. However, the exemplary decompression process shown in Appendix B indicates continuous tone data bytes using a segmentation bit having a value of 0. This difference is the result of industry conventions and considerations of compatibility with conventional apparatuses, e.g., conventional image data sources. However, in the following description of the exemplary embodiments of the systems and methods of this invention, continuous tone data bytes are consistently indicated using a segmentation bit having a value of 0.

FIG. 1 is an illustrative example of an image region to be compressed and decompressed in accordance with decompression and compression systems and methods of this invention. As shown in FIG. 1, prior to compression, the region includes 400 ppi pixels E, F, G and H. However, the region is also divided into four quadrants I–IV. As will become clear below, each quadrant corresponds to the 800 ppi pixels A, B, C and D produced during decompression. As a result of the compression, the compressed data bytes P', Q', R' and S' define the image values for each quadrant I–IV, where each quadrant contains the 800 ppi non-continuous tone pixels A, B, C and D. To compress the data associated with the 800 ppi pixels A–D in each quadrant I–IV into a single data byte corresponding to the 400 ppi resolution, while maintaining 800 ppi resolution across an edge contained in a quadrant containing non-continuous tone data, the 800 ppi pixel A and one of the 800 ppi pixels B or C are each reduced to three-bit nibbles. That is, the byte-wise image values associated with two 800 ppi non-continuous tone pixels are compressed into one compressed data byte. For example, following compression, a non-continuous tone byte P', Q', R' or S' includes a three-bit nibble a, indicating the image value of a first expressly-defined 800 ppi pixel (comprising bits $B_7$–$B_5$), a three-bit nibble γ, indicating the image value of a second explicitly-defined 800 ppi pixel (comprising bits $B_4$–$B_2$), a direction bit $B_1$ indicating a direction of an edge located between the explicitly-defined 800 ppi pixels, and a segmentation bit $B_0$ indicating whether the byte contains non-continuous tone data, or continuous tone data. Therefore, nibbles a and γ are associated with the uncompressed 800 ppi pixels located across an edge of α mark to be rendered. For example, during compression of quadrant I, values associated with the 800 ppi pixel A and one of the 800 ppi pixels B or C, which are, for example, bytes of data, are each reduced to three-bit values. The three-bit value for the 800 ppi pixel A is then used to form the α nibble, while the three-bit value for the one of the 800 ppi pixels B or C is used to form the γ nibble. The a and γ nibbles are then stored in the compressed data byte P'.

If quadrant I contains a vertical edge, the compression process compresses the image values of the 800 ppi pixels A and B into a single byte of data because the 800 ppi pixel B is across the vertical edge from the 800 ppi pixel A. Alternatively, if quadrant I contains a horizontal edge, the compression process compresses the image values of the 800 ppi pixels A and C into a single byte of data, because the 800 ppi pixel C is across the horizontal edge from the 800 ppi pixel A.

In this example, the image values of the other one of the 800 ppi pixels B or C and the 800 ppi pixel D are not used to form the α and γ nibbles of the byte P'. Rather, the image values for those 800 ppi pixels are discarded and synthesized during decompression from the a and γ nibbles of the corresponding data byte P', as well as the information in the data bytes corresponding to quadrant II, i.e., the byte Q', and/or quadrant III, i.e., the byte R', depending on the direction of the edge located in quadrant I indicated by bit $B_1$ of the byte P'. For example, during decompression, if an edge extends vertically between the 800 ppi pixels A and B in quadrant I, the data byte P' will be used to form the 800 ppi pixels A and B of quadrant I. In particular, the α nibble will be used to form the 800 ppi pixel A and the γ nibble will be used to form the 800 ppi pixel B. The image values of the 800 ppi pixels C and D of quadrant I are synthesized from the data bytes P' and R' because the 800 ppi pixels C and D were discarded during compression.

Figure 2:
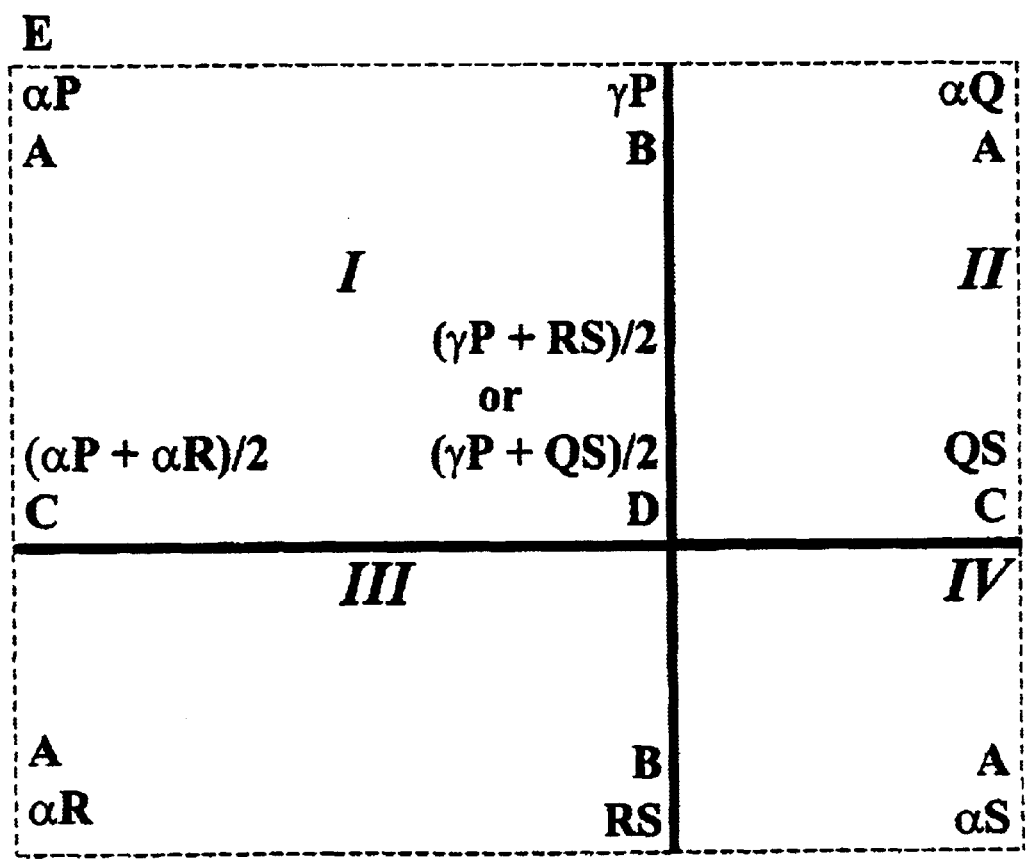
FIG. 2 illustrates a portion of an image region including exemplary values for an 800 ppi pixel when a direction bit of the compressed data byte indicates the quadrant contains a vertical edge.

FIG. 2 illustrates a portion of the region occupied by the 400 ppi pixels E, F, G and H, the region including exemplary 800 ppi pixel image values, when the direction bit $B_1$ of the data byte P' indicates that quadrant I contains a vertical edge. FIG. 2 shows the 800 ppi pixels A–D of quadrant I, the 800 ppi pixels A and C of quadrant II, the 800 ppi pixels A and B of quadrant III and the 800 ppi pixel A of quadrant IV. The image value of the 800 ppi pixel A of quadrant I is αP. Similarly, the image values of the 800 ppi pixels A of quadrants II–IV are αQ, αR and αS, respectively. The 800 ppi pixel B of quadrant I is located equidistant between the 800 ppi pixel A of quadrant I and the 800 ppi pixel A of quadrant II. Because the direction bit $B_1$ indicates a vertical edge, the image value of the 800 ppi pixel B of quadrant I is the γ nibble of the data byte P', i.e., γP.

The 800 ppi pixel C of quadrant I is located equidistant between the 800 ppi pixel A of quadrant I and the 800 ppi pixel A of quadrant III. Because bit $B_1$ indicates a vertical edge, the image value of the 800 ppi pixel C of quadrant I is synthesized as $(\alpha P+\alpha R)/2$.

The 800 ppi pixel B of quadrant III is located equidistant between the 800 ppi pixel A of quadrant III and the 800 ppi pixel A of quadrant IV. The image value of the 800 ppi pixel B of quadrant III is RS, where RS is either the γ nibble of the byte of R', i.e., γR, or is synthesized from the two α nibbles of the data byte R' (quadrant III) and data byte S' (quadrant IV), i.e., $(\alpha R+\alpha S)/2$. The particular method for determining the image value RS depends at least on whether the direction bit $B_1$ of the data byte R' associated with quadrant III indicates that quadrant III contains a vertical edge or a horizontal edge and whether the segmentation bits $B_0$ of the bytes R' and S' data bytes indicate continuous tone data.

Similarly, the 800 ppi pixel C of quadrant II is located equidistant between the 800 ppi pixel A of quadrant II and the 800 ppi pixel A of quadrant IV. The image value of the 800 ppi pixel C is QS, where QS is either the γ nibble of the byte Q', i.e., γQ, or is synthesized from the data bytes Q' and S', i.e., $(\alpha Q+\alpha S)/2$. The particular method for determining the image value of pixel QS depends at least on whether the direction bit $B_1$ for the byte Q', associated with quadrant II, indicates a vertical edge or a horizontal edge and whether the segmentation bit $B_0$ for the data bytes Q' and S', associated with quadrants II and IV indicate continuous tone data.

The 800 ppi pixel D of quadrant I is located equidistant between the 800 ppi pixel A of quadrants I–IV. The image value of the 800 ppi pixel D of quadrant I is synthesized as either $(\gamma P+RS)/2$ or as $(\gamma P+QS)/2$. The particular method for determining the image value associated with the 800 ppi pixel D depends on whether there are values associated with QS or RS. For example, as illustrated in FIG. 2, if data bytes Q' and S', corresponding to quadrants II and IV, respectively, both contain continuous tone data, there is no value available for QS. Therefore, calculating the 800 ppi pixel D of quadrant I as $(\gamma P+RS)/2$ is appropriate. Alternatively, if data bytes R' and S', corresponding to quadrants III and IV, respectively, both contain continuous tone data, there is no value available for RS and calculating the 800 ppi pixel D of quadrant I as $(\gamma P+QS)/2$ is appropriate.

Figure 3:
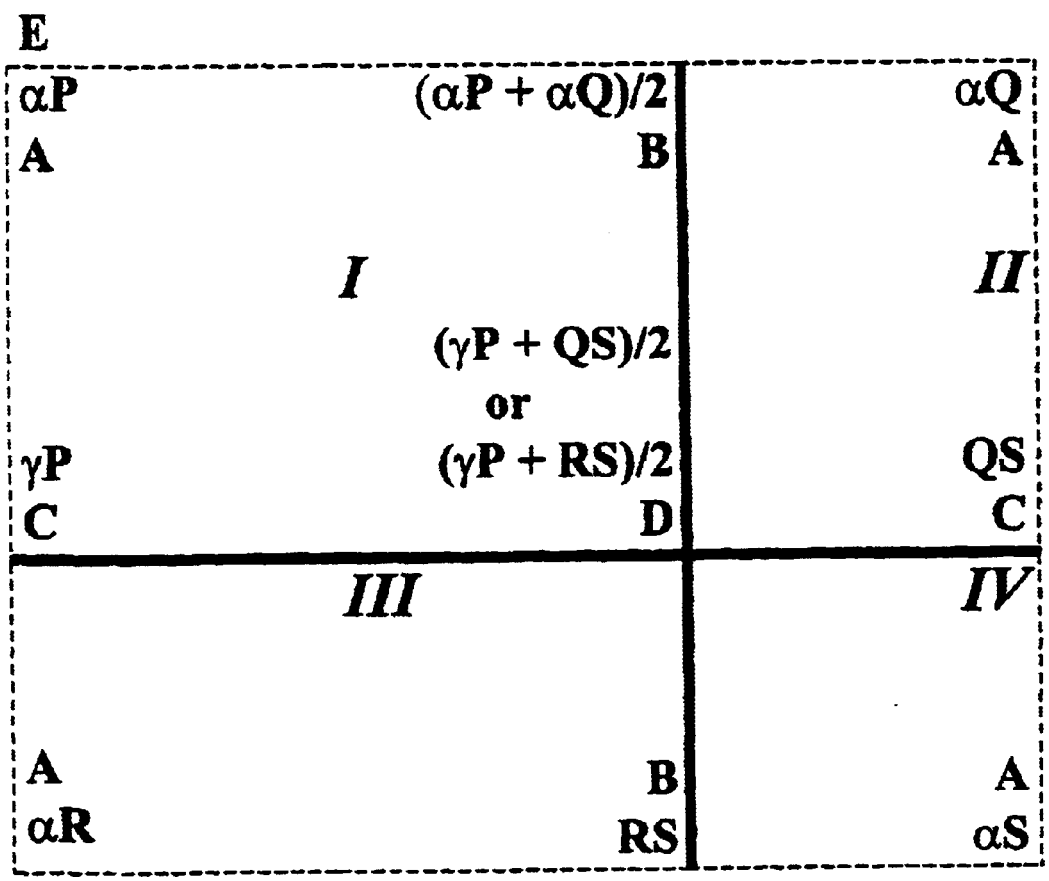
FIG. 3 illustrates a portion of an image region including exemplary values for an 800 ppi pixel when a direction bit of the compressed data byte indicates the quadrant contains a horizontal edge.

FIG. 3 illustrates a portion of the region occupied by the 400 ppi pixels E, F, G and H, including exemplary 800 ppi pixel image values, when the direction bit $B_1$ of the data byte P' indicates that quadrant I contains a horizontal edge. FIG. 3 shows the 800 ppi pixels A–D of quadrant I, the 800 ppi pixels A and C of quadrant II, the 800 ppi pixels A and B of quadrant III, and the 800 ppi pixel A of quadrant IV. As in FIG. 2, the image values of the 800 ppi pixels A of quadrants I–IV are $\alpha P$, $\alpha Q$, $\alpha R$ and $\alpha S$, respectively. The 800 ppi pixel B of quadrant I is located equidistant between the 800 ppi pixel A of quadrant I and the 800 ppi pixel A of quadrant II. Because the direction $B_1$ indicates a horizontal edge, the image value of the 800 ppi pixel B of quadrant I is $(\alpha P+\alpha Q)/2$. The 800 ppi pixel C of quadrant I is located equidistant between the 800 ppi pixel A of quadrant I and the 800 ppi pixel A of quadrant III. Because the direction of $B_1$ indicates a horizontal edge, the image value of the 800 ppi pixel C of quadrant I is the $\gamma$ nibble of the byte P', i.e., $\gamma P$.

The 800 ppi pixel B of quadrant III is located equidistant between the 800 ppi pixel A of quadrant III and the 800 ppi pixel A of quadrant IV. The image value of the 800 ppi pixel B of quadrant III is RS, where RS either is the $\gamma$ nibble of the byte R', i.e., $\gamma R$, or is synthesized from the two $\alpha$ nibbles of the data byte R' (quadrant III) and data byte S' (quadrant IV) as $(\alpha R+\alpha S)/2$. The particular method for determining the image value RS depends at least on whether the direction bit $B_1$ for the data byte R' indicates that quadrant III contains a vertical edge or a horizontal edge, and whether the segmentation bits $B_0$ for the data bytes R' and S' indicate continuous tone data. The 800 ppi pixel D of quadrant I is located equidistant from the 800 ppi pixels A of quadrant I–IV. The image value associated with the 800 ppi pixel D of quadrant I is synthesized to be $(\gamma P+QS)/2$, or $(\gamma P+RS)/2$. As discussed above, with reference to FIG. 2, the particular method for determining the image value of the 800 ppi pixel D of quadrant I depends at least on the availability of values for QS and RS.

The 800 ppi pixel C of quadrant II is located equidistant from the 800 ppi pixel A of quadrants II and IV. The image value of the 800 ppi pixel C is synthesized as the temporary pixel QS, where the image value of the temporary pixel QS is synthesized as either $\gamma Q$ or $(\alpha Q+\alpha S)/2$. The particular method for determining the image value of the temporary pixel QS depends at least on whether the direction bit $B_1$ for the byte Q' associated with quadrant II, indicates a vertical edge or a horizontal edge and whether the segmentation bit $B_0$ for the data bytes Q' and S' associated with the quadrants II and IV, respectively, indicate continuous tone data.

FIG. 4 illustrates the region occupied by the 400 ppi pixels E, F, G and H and containing quadrants I–IV corresponding to the bytes P'–S' to be decompressed using the decompression systems and methods of this invention. In FIG. 4, the last pointer, LSTPTR, indicates the position of a last 400 ppi raster line. The source pointer, SRCPTR, indicates the position of a current 400 ppi raster line, and the next pointer, NXTPTR, indicates the position of the next 400 ppi raster line. FIG. 4 also illustrates a region including the same region illustrated in FIG. 1.

Figure 5:
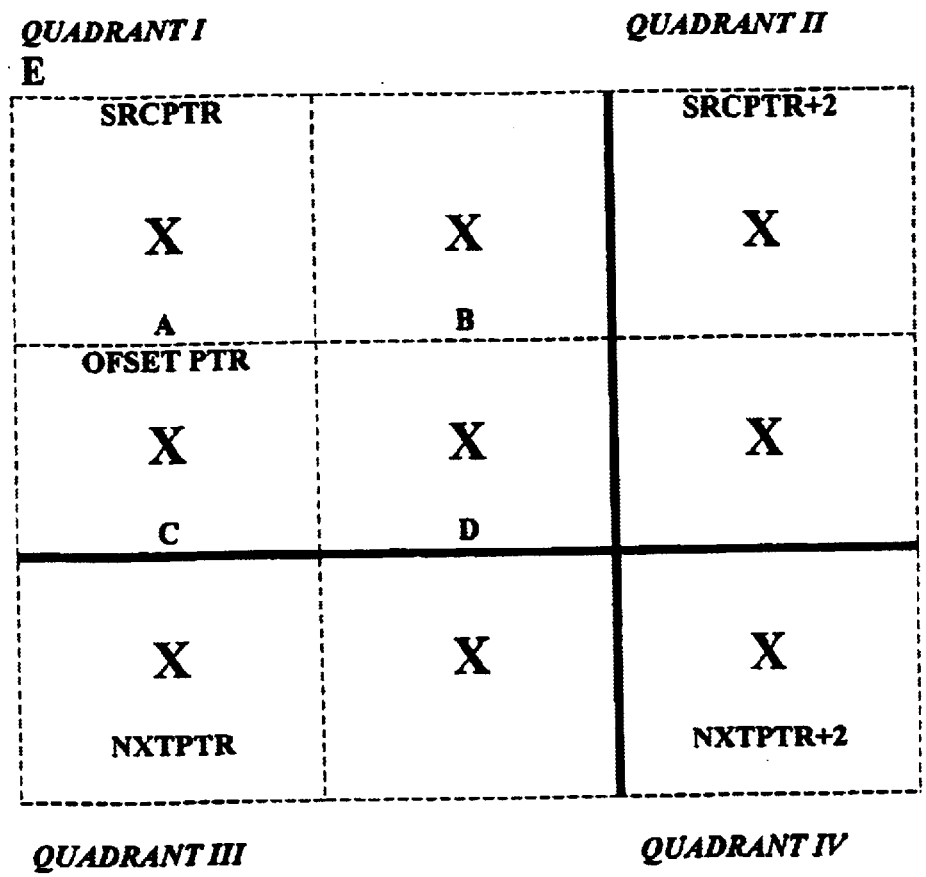
FIG. 5 illustrates the region illustrated in FIGS. 2 and 3 with reference to pointers used during compression and decompression.

FIG. 5 illustrates the same regions illustrated in FIGS. 2 and 3 with reference to the various pointers used during compression and decompression. The offset pointer, OFSETPTR, is located in front of the source pointer, SRCPTR, by the length of one fine, i.e., 800 ppi, raster line of image data and is used to position the 800 ppi pixels A, B, C and D during compression and decompression.

Figure 6:
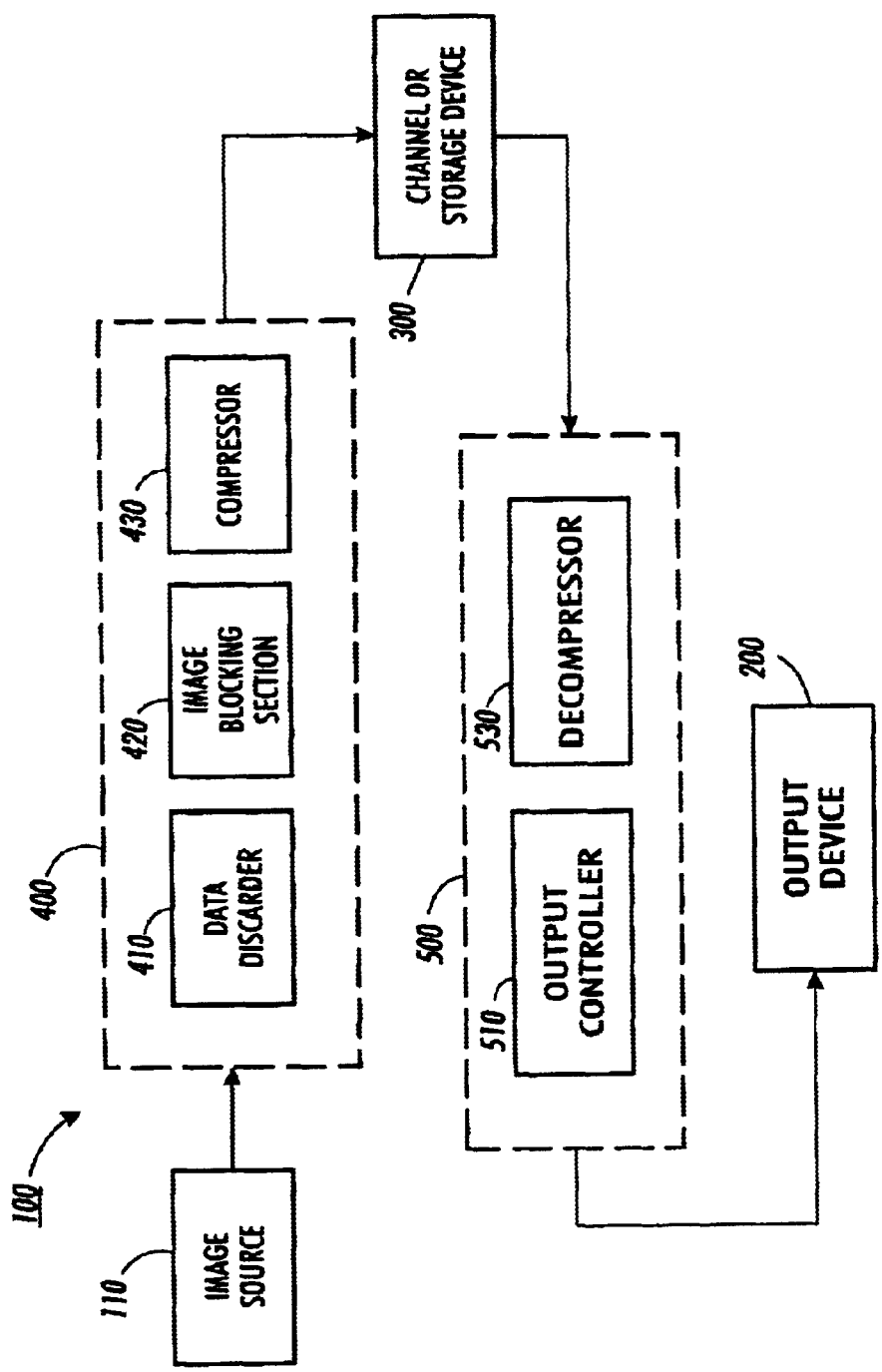
FIG. 6 illustrates an exemplary expression and decompression system of this invention.

FIG. 6 shows one exemplary embodiment of a generalized functional block diagram of a compression and decompression system 100 according to the invention. The compression and decompression system 100 includes an image source 110 that may be any one of a number of different devices, such as a scanner, a digital copier or a facsimile device, that is suitable for generating electronic image data, or a device suitable for storing and/or transmitting the electronic image data, such as a client or a server of a network. The electronic image data from the image source 110 is provided to an encoder 400 of the compression and decompression system 100.

In particular, the encoder 400 includes a data discarder 410 that discards data that is unnecessary in the compression process, an image blocking portion 420 that divides the remaining image data into a plurality of M×M blocks, and a compressor 430. The blocking operation performed by the image blocking portion 420 may be accomplished by windowing or cropping that enables the transfer of data comprising one or more M×M blocks of data from the input document to a block memory to be stored in the encoder 400. For example, the M×M block of image data may include data corresponding to one or more quadrants. Once stored the data is input by the compressor 430. In the compressor 430, the M×M blocks of image data are compressed to form compressed image data, as discussed below in detail.

Once compressed, the compressed image data is transferred to a channel or storage device 300. The channel or storage device 300 can be either, or both, of a channel device for transmitting the compressed image data to a decoder 500 and a storage device for indefinitely storing the compressed image data until there arises a need to decompress the compressed image data. The channel device can be any known structure or apparatus for transmitting the compressed image data from the encoder 400 according to this invention to a physically proximate or a remote decoder 500 according to this invention. Thus, the channel device can be a public switched telephone network, a local or wide area network, an intranet, the Internet, a wireless transmission channel, any other distributed network, or the like. Similarly, the storage device can be any known structure or apparatus for indefinitely storing compressed image data, such as a RAM, a floppy drive and disk, a hard drive and disk, flash memory or the like.

The compressed image data is then decompressed by the decoder 500 as described below. In particular, the decoder 500 includes a decompressor 530 that receives compressed image data from the channel or storage device 300 and an output controller 510 that pastes the blocks of decompressed image data from the decompressor 530 into the corresponding positions in the decompressed image.

Although the decoder 500 is shown in FIG. 6 as physically separate from the encoder 400, it should be understood that the decoder 500 and the encoder 400 may be different aspects of a single physical device.

As shown in FIG. 6, the output controller 510 sends the reconstructed image to an output device 200. The output device 200 can be any device that is capable of processing the decompressed image data generated according to the invention. For example, the output device 200 can be a printer, such as a laser printer, an ink jet printer, a thermal printer, a dot matrix printer, a digital photocopier or the like, a display device, such as a CRT, flat panel LCD or LED display, or the like. Moreover, the decompressor 500 can be physically incorporated into the printer or the display device.

Figure 7:
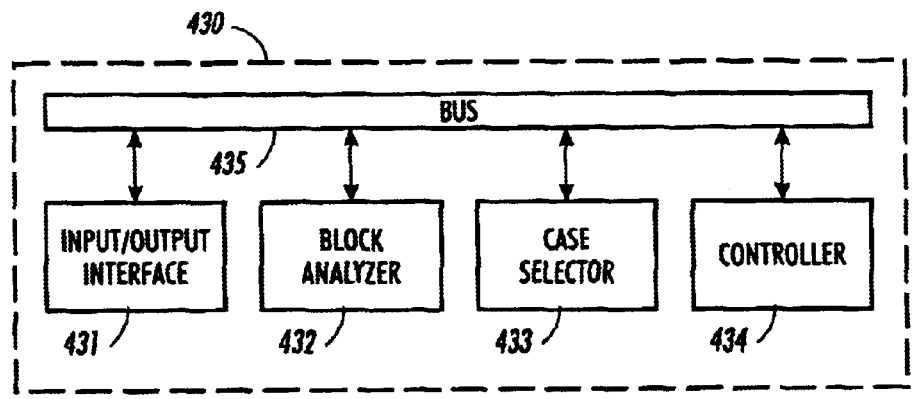
FIG. 7 illustrates a more detailed view of an exemplary compressor used in accordance with the invention.

FIG. 7 shows in greater detail one exemplary embodiment of the compressor 430. As illustrated in FIG. 7, the compressor 430 includes an input/output interface 431, a block analyzer 432, a case selector 433, a controller 434 and a bus 435 that connects the input/output interface 431, the block analyzer 432, the case selector 433 and the controller 434. A block of image data is input to the compressor 430 through the input/output interface 431. The block analyzer 432, under control of the controller 434, analyzes the composition of the data block to determine how compression should be performed. Based on the composition of the block, e.g., the amount and location of non-continuous tone data in the block of image data, the case selector 433, under control of the controller 434, performs compression based on a number of cases indicative of different compositions of the block of image data. The compressor 430, under control of the controller 434, based on the selected case or cases, compresses the block of image data as discussed below. During compression, a block of image data M×M may include as little as a single byte of image data, when the byte contains continuous tone data, or as little as two bytes of image data, when the bytes contain non-continuous tone data.

Figure 8:
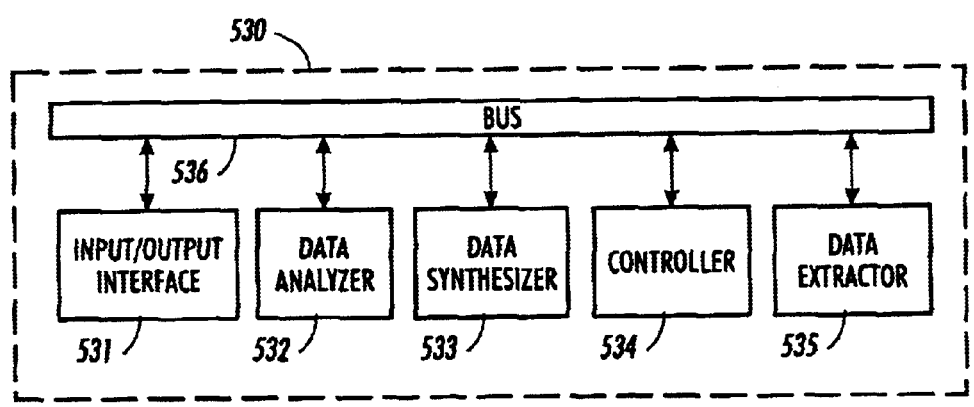
FIG. 8 illustrates a more detailed view of an exemplary decompressor used in accordance with the invention.

FIG. 8 shows in greater detail one exemplary embodiment of the decompressor 530. As illustrated in FIG. 8, the decompressor 530 includes an input/output interface 531, a block analyzer 532, a block synthesizer 533, a controller 534, a data extractor 535, and a bus 536 that connects them together. A block of compressed image data is input to the compressor 530 through the input/output interface 531. The block analyzer 532, under control of the controller 534, analyzes the segmentation and direction bits of each byte of compressed image data to determine how to decompress each byte of compressed image data. Based on the segmentation and direction bits of a compressed image data byte, the data extractor 535, under control of the controller 534, extracts the image values for the explicitly-defined pixels, i.e., for either a single continuous tone 800 ppi pixel or a pair of non-continuous tone 800 ppi pixels. The controller 534 also controls the data synthesizer 533 to synthesize additional values for non-continuous tone 800 ppi pixels. The controller 534 also controls processing of the continuous tone data to replicate three times the single continuous tone pixel value stored in the data byte to provide the necessary values to adequately define the image values for the pixels of an 800 ppi grid. Specifically, by replicating the image value of the single explicitly-defined continuous tone pixel three times, the decompressor 530 produces the image values for four 800 ppi pixels.

In operation of the exemplary embodiments of the compression and decompression system 100 shown in FIGS. 6–8, the image source 100 supplies high spatial resolution image data that is input to the encoder 400. The data discarder 410 discards that portion of the image data that is unnecessary for the compression and decompression process. For example, in a first exemplary embodiment of the compression and decompression system 100, the image data source 110 produces image data including continuous tone data and non-continuous tone data that is in a high spatial resolution bytemap, e.g., 800 ppi, that is input to the encoder 400. For every four bytes of continuous tone data, the data discarder 410 discards three of the bytes and outputs low spatial resolution, e.g., 400 ppi, continuous tone data to the image blocking section 420. For every four bytes of non-continuous tone data, the data discarder 410 discards two of the non-continuous tone data bytes and outputs the remaining data two non-continuous tone bytes to the image blocking section 420. Specifically, the data discarder 410 discards the non-continuous tone data corresponding to the pixels that are in a direction parallel to an edge of a mark in each quadrant of image data. The data discarder 410 does not discard the non-continuous tone data corresponding to the pixels that are in a direction perpendicular to an edge in each image data quadrant. Therefore, if data of four non-continuous tone pixels are input to the discarder 410, the discarder outputs two pixels that lie across the edge from each other and discards the other two pixels that are adjacent to those pixels.

This discarding is performed because the decoder 500 can synthesize the discarded pixels of non-continuous tone data that are located in the low spatial resolution direction from the pixels that are not discarded. Half of the non-continuous tone data are discarded so that resolution is reduced in the direction parallel to the edges but half of the non-continuous tone data bytes are kept so that spatial resolution is maintained in the direction perpendicular to the edge. Therefore, in this first exemplary embodiment of the compression and decompression system 100, the data discarder 410 produces low spatial resolution continuous tone data and non-continuous tone data that has a high spatial resolution in the directions perpendicular to edges of marks within the image.

Following the discarding by the data discarder 410, the image blocking section 420 divides the remaining image data into a plurality of M×M blocks and outputs these blocks to the compressor 430. The compressor 430 then compresses the blocks of remaining image data. In particular, if a current block of image data is continuous tone image data, the compressor 430 inputs each 800 ppi pixel of the M×M block in turn. The bit $B_0$ of each continuous tone data byte is converted to a segmentation bit by setting its value to 0, regardless of the original value of bit $B_0$, to designate that the byte as containing continuous tone data.

In contrast, if the current block of the image data is non-continuous tone data, the compressor 430 inputs the next two bytes of non-continuous tone image data corresponding to the two non-continuous tone pixels that are adjacent to each other across the edge. The compressor 430 also determines whether the edge between the adjacent two non-continuous tone pixels is vertical or horizontal. The compressor 430 then selects the three most significant bits, $B_7$–$B_5$ of the first uncompressed byte of non-continuous tone image data and selects the next three most significant bits $B_7$–$B_5$ of the second uncompressed byte of non-continuous tone image data and stores the selected bits $B_7$–$B_5$ and $B_7$–$B_5$ of the first and second uncompressed data bytes as the bits $B_7$–$B_2$ of the corresponding compressed data byte. The compressor 430 then sets the direction bit $B_1$ to 0 or 1 depending on whether the edge is vertical or horizontal respectively. The compressor 430 then sets the segmentation bit $B_0$ to 1 to indicate that the compressed data byte contains non-continuous tone data.

Because the data corresponding to half of the non-continuous tone pixels is discarded in the direction parallel to the edge, the memory necessary to store the compressed non-continuous tone data is decreased to a quarter of the memory required to store the original non-continuous tone data. Values associated with the discarded non-continuous tone data are synthesized by the decoder 500 using the direction bit $B_1$, segmentation bit $B_0$ and other explicitly-defined data in the surrounding bytes of non-continuous tone data to improve the spatial resolution of the non-continuous tone data. The discarded continuous tone data bytes are inferred by the decoder 500 to produce enough data to provide the image values for an image printed using an 800 ppi grid. However, the continuous tone data remains at a low spatial resolution, e.g., 400 ppi, because, as discussed above, replication does not improve the spatial resolution of the continuous tone data. Specifically, the decoder merely replicates the image value of an explicitly-defined pixel to produce four 800 ppi pixels. However, because information used to produce the four 800 ppi pixels is identical, the resulting four 800 ppi pixels are the equivalent of a single 400 ppi pixel value.

In operation of a second exemplary embodiment of the compression and decompression system 100 according to this invention, the image source 110 supplies low spatial resolution continuous tone data, e.g., at a 400 ppi resolution, and high spatial resolution non-continuous tone data, e.g., at an 800 ppi resolution. Therefore, the high spatial resolution non-continuous tone data is compressed in the same manner as in the first exemplary embodiment of the compression and decompression system 100. However, the data discarder 410 does not need to discard any continuous tone data, because the data already has a low spatial resolution. Therefore, similarly to the first exemplary embodiment of the compression and decompression system 100, the data discarder 410 produces low spatial resolution continuous tone data and non-continuous tone data that has a high spatial resolution in directions perpendicular to the edges of marks in the image.

Subsequently, the image blocking section 420 divides the remaining image data into a plurality of M×M blocks and outputs these blocks to the compressor 430. The compressor 430 then performs compression on the blocks of remaining image data. In particular, if a current block of image data contains continuous tone data, the compressor 430 inputs each pixel of the block in turn. The bit $B_0$ of each continuous tone byte is converted to the segmentation bit by setting its value to 0, regardless of the original value of bit $B_0$, to indicate continuous tone data.

In contrast, if the current block of the image data is non-continuous tone data, the compressor 430 inputs the next two bytes of non-continuous tone image data corresponding to the two non-continuous tone pixels that are adjacent to each other across the edge. The compressor 430 also determines whether the edge between the adjacent two non-continuous tone pixels is vertical or horizontal. The compressor 430 then extracts the three most significant bits $B_7$–$B_5$ of each of the two non-continuous tone image-data bytes and stores these six bits as $B_7$–$B_2$ of the corresponding compressed data byte. The compressor 430 then sets the direction bit $B_1$ to 0 or 1 depending on whether the edge is vertical or horizontal, respectively. The compressor 430 then sets the segmentation bit $B_0$ to 1.

In the operation of a third exemplary embodiment of the compression and decompression system 100 according to the invention, the image source 110 supplies low spatial resolution continuous tone data. The image source 110 also supplies non-continuous tone data that has a high spatial resolution only in directions perpendicular to edges in the image data. Therefore, the image data supplied by the image source 110 will be passed unchanged by the data discarder 410. Thus, in this third exemplary embodiment of the compression and decompression system 100, the data discarder 410 can be omitted and the image data provided directly to the image blocking section 420. Therefore, transmitting and/or storing the storage image data supplied by the image source 110 requires significantly less memory than is conventionally necessary.

The image blocking section 420 divides the supplied image data into a plurality of M×M blocks and outputs these blocks to the compressor 430. The compressor 430 then compresses the blocks of supplied image data. In particular, if a current block of image data contains continuous tone data, the compressor 430 inputs each pixel of the block in turn. The bit $B_0$ of each continuous tone byte is converted to the segmentation bit by setting its value to 0, regardless of the original value of bit $B_0$ of that image data byte.

In contrast, if the current block of the image data is non-continuous tone data, the compressor 430 inputs the next two bytes of non-continuous tone image data, corresponding to the two non-continuous tone pixels, that are adjacent to each other across the edge. The compressor 430 also determines whether the edge between the adjacent two non-continuous tone pixels is vertical or horizontal. The compressor 430 then extracts the three most significant bits $B_7$–$B_5$ of each of the two non-continuous tone bytes and stores these six bits as bits $B_7$–$B_2$ of the corresponding compressed data byte. The compressor 430 then sets the direction bit $B_1$ to 0 or 1 depending on whether the edge is vertical or horizontal, respectively. The compressor 430 then sets the segmentation bit $B_0$ to 1.

The resulting compressed non-continuous tone data is decompressed in the same manner as the first exemplary embodiment of the compression and decompression system 100 to provide high spatial resolution non-continuous tone data. The low spatial resolution continuous tone data is processed to provide low spatial resolution data in the same manner as the first embodiment.

That portion of the compression process performed by the compressor 430 is the same for the three exemplary embodiments of the compression and decompression system 100 discussed above. Similarly, that portion of the decompression process performed by the decompressor 530 is the same for the three exemplary embodiments of the compression and decompression system 100 discussed above.

FIGS. 9(A)–9(D) outline one exemplary embodiment of a method for compressing continuous tone image data and non-continuous tone image data according to this invention. As a preliminary matter, it should be appreciated that the following discussion of the 800 ppi pixels A, B, C and D also refers to data bytes A', B', C' and D'. These data bytes A', B', C' and D' are compressed following blocking. Therefore, the byte A' contains uncompressed data that corresponds to the 800 ppi pixel A. Similarly, the bytes B', C' and D' contain uncompressed data that correspond to the 800 ppi pixels B, C, and D, respectively. The compression methods and systems according to the invention, discussed below, perform lossy decompression on the data bytes A', B', C' and D' to compress the data into a single byte of information, for example, the byte P' shown in FIG. 1.

Figure 9A:
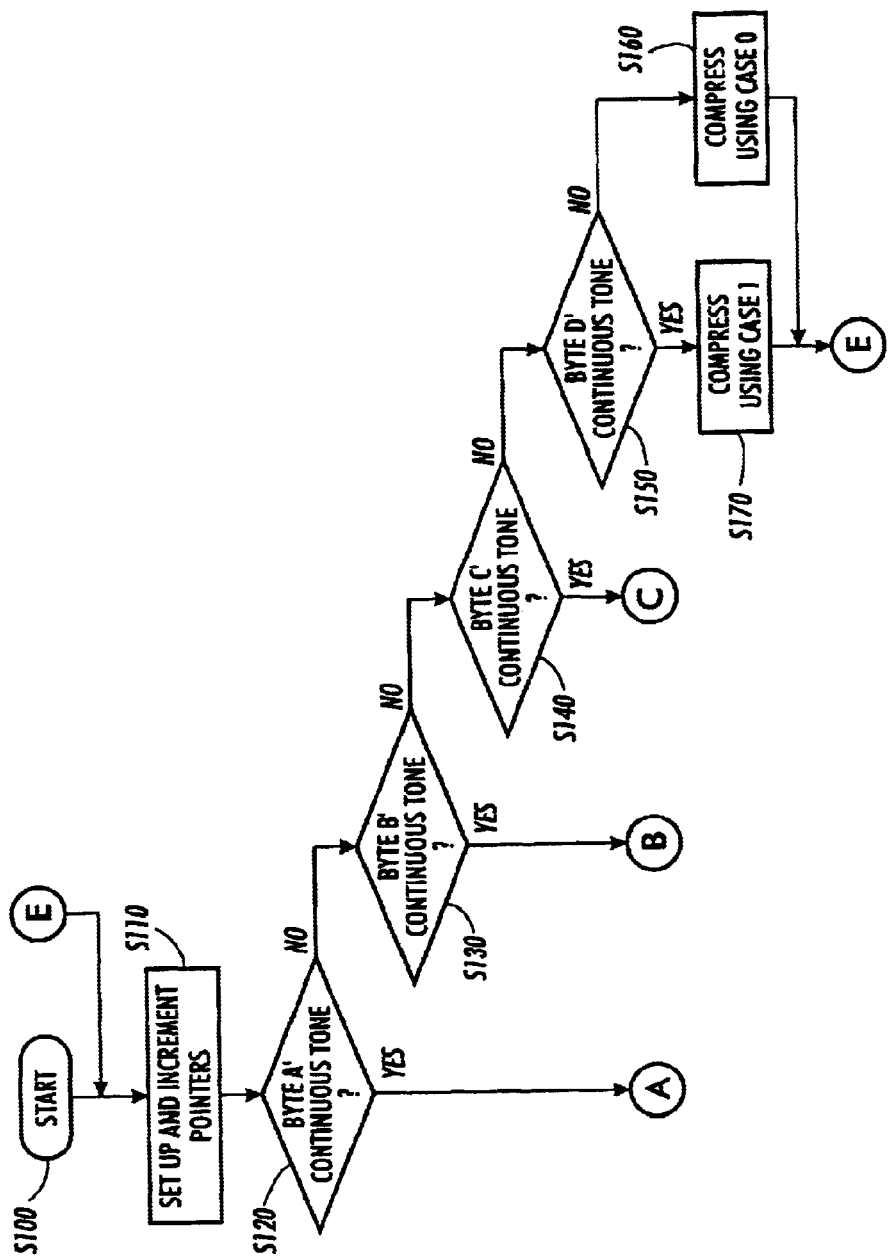
FIGS. 9(A)–9(D) outline one exemplary embodiment of the compression process.

As illustrated in FIG. 9(A), the compression process begins in step S100, and proceeds to step S110, where pointers used during the compression process are set up and incremented. For example, as shown in the exemplary embodiment of the method outlined in Appendix A, the pointers and variables i, j, pxelPtr, scnPtr, bA, bB, bC and bD are used during the compression process. In step S110, the pointers are set up and are incremented after each image region is compressed. The pointers are incremented to move to a next image region corresponding to a M×M block of data to be compressed, such as, for example, a next quadrant of image data. Therefore, as will become clear below, control proceeds to step S110 to analyze the next image region following compression of each image region. Control then proceeds to step S120.

In step S120, a determination is made whether the 800 ppi pixel A is continuous tone data or non-continuous tone data by referring to the segmentation bit $B_0$ in the data byte A'. If, in step S120, the 800 ppi pixel A is determined to be non-continuous tone data, control proceeds to step S130. Otherwise control jumps to step S280 illustrated in FIG. 9(D). In step S130, a determination is made whether the 800 ppi pixel B is continuous tone data or non-continuous tone data by referring to the segmentation bit $B_0$ in the data byte B'. If, in step S130, the 800 ppi pixel B is determined to be non-continuous tone data, control proceeds to step S140. In Otherwise control jumps to step S210 illustrated in FIG. 9(C).

In step S140, a determination is made whether the 800 ppi pixel C is continuous tone data or non-continuous tone data by referring to the segmentation bit $B_0$ in the data byte C'. If, in step S140, the 800 ppi pixel C is determined to be non-continuous tone data, control proceeds to step S150. Otherwise, control jumps to step S180 illustrated in FIG. 9(B).

In step S150, a determination is made whether the 800 ppi pixel D is continuous tone data or non-continuous tone data by referring to the segmentation bit $B_0$ in the data byte D'. If, in step S150, the 800 ppi pixel D is determined to be non-continuous tone data, control continues to step S160. In step S160, the data bytes A'–D' are compressed in accordance with case 0 to compress the non-continuous tone data contained in the quadrant containing pixels A, B, C and D. Control then jumps back to step S110.

If, in step S150, the 800 ppi pixel D is continuous tone data, control proceeds to step S170, in which compression is performed using case 1. Control then jumps back to step S110.

Figure 9B:
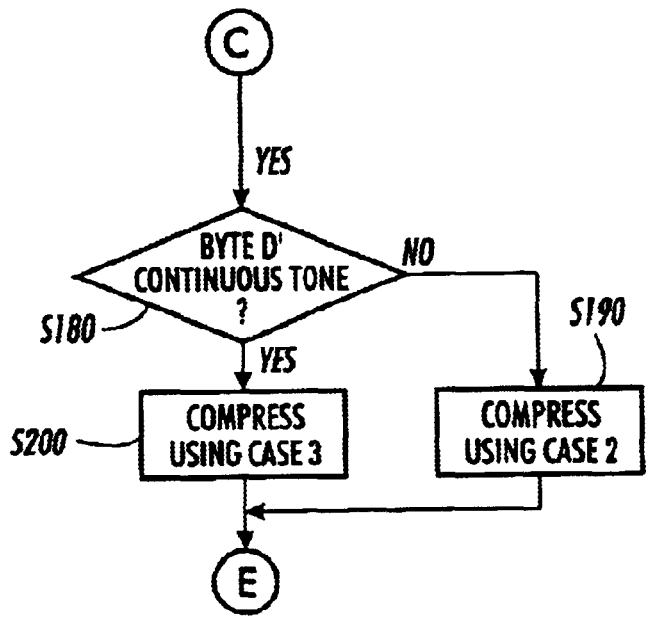
Figure 9C:
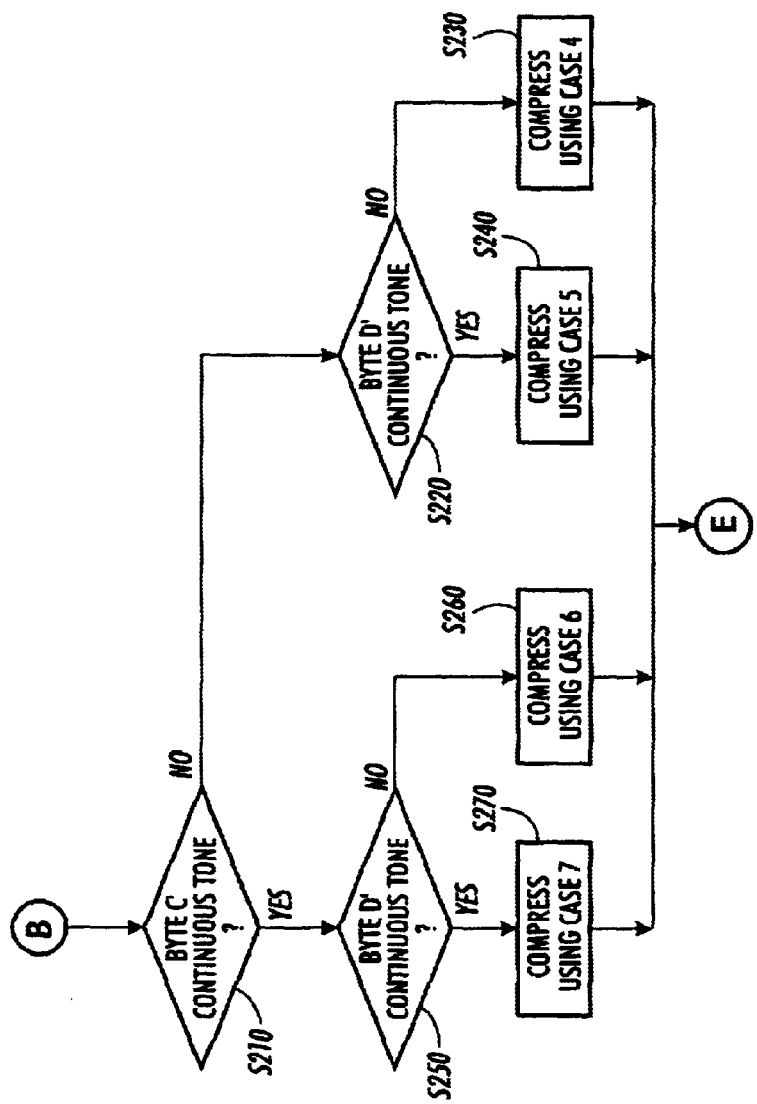
Figure 9D:
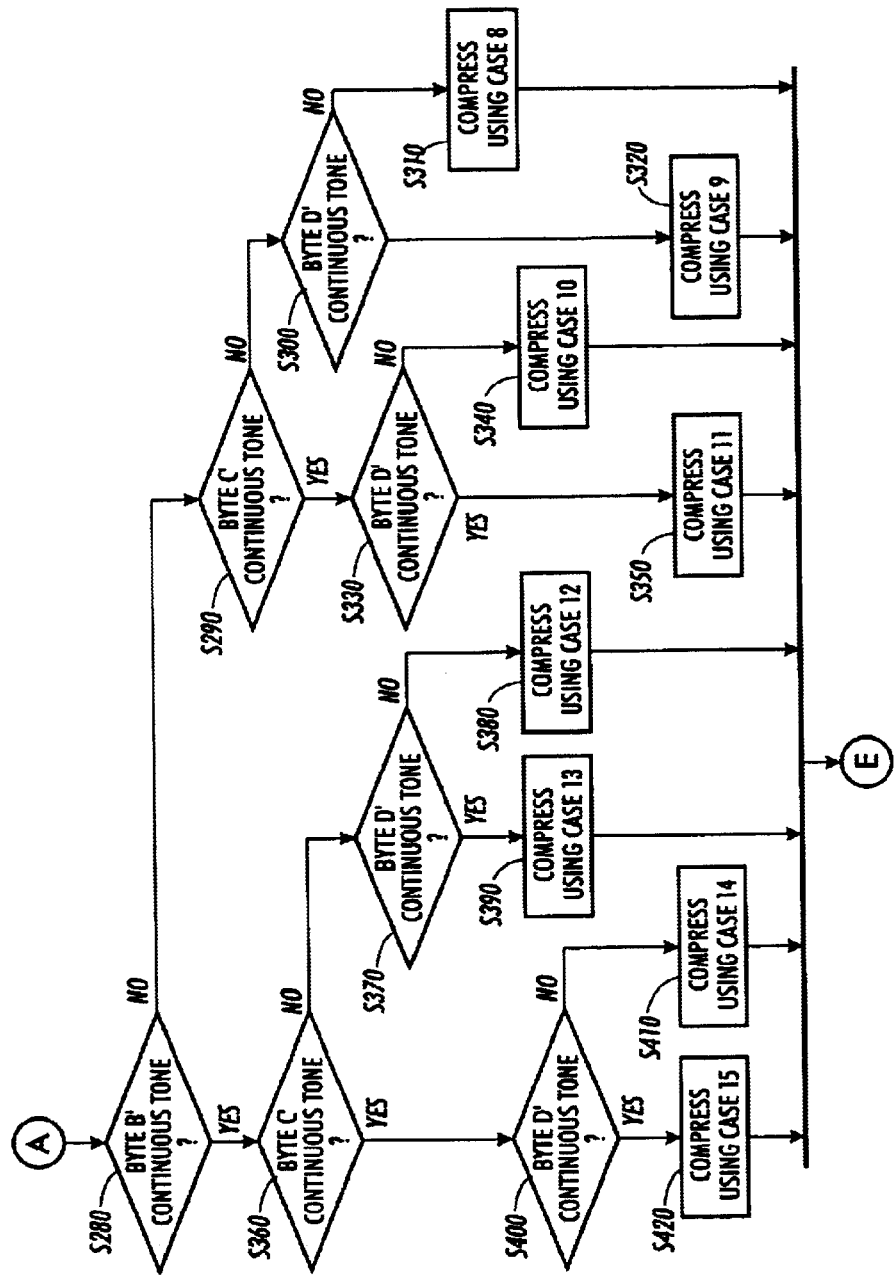

In step S180, illustrated in FIG. 9(B), a determination is made whether the byte D' contains non-continuous tone or continuous tone data. If, in step S180, the byte D' is determined to be non-continuous tone, control proceeds to step S190. Otherwise, control jumps to step S200, illustrated in FIG. 9(B). In step S190, the bytes A'–D' are compressed using case 2. Control then jumps back to step S110. In contrast, in step S200, the bytes A'–D' are compressed using case 3. Control then jumps back to step S110.

In step S210, a determination is made whether the 800 ppi pixel C is continuous tone data or non-continuous tone data. If the 800 ppi pixel C is determined to be non-continuous tone data, control proceeds to step S220. Otherwise, control jumps to step S250. In step S220, the bytes A'–D' are compressed using case 4. Control then jumps back to step S110. In contrast, in step S250, the bytes A'–D' are compressed using case 5. Control then jumps back to step S110.

In step S250, a determination is made whether the 800 ppi pixel D is continuous tone data or non-continuous tone data. If the 800 ppi pixel D is determined to be non-continuous tone data, control proceeds to step S260. Otherwise, control jumps to step S270. In step S260, the bytes A'–D' are compressed using case 6. Control then jumps back to step S110. In contrast, in step S270, the bytes of data are compressed using case 7. Control then jumps back to step S110.

In step S280, a determination is made whether the 800 ppi pixel B is non-continuous tone data or continuous tone data. If the 800 ppi pixel B is determined to be non-continuous tone data, control proceeds to step S290. Otherwise, control jumps to step S360.

In step S290, a determination is made whether the 800 ppi pixel C is continuous tone data or non-continuous tone data. If the 800 ppi pixel C is determined to be non-continuous tone data, control proceeds to step S300. Otherwise, control jumps to step S330.

In step S300, a determination is made whether the 800 ppi pixel D is continuous tone data or non-continuous tone data. If the 800 ppi pixel D is non-continuous tone data, control proceeds to step S310. Otherwise, control jumps to step S320. In step S300, the bytes A'–D' are compressed using case 8. Control then jumps back to step S110. In contrast, in step S320, the bytes A'–D' are compressed using case 9. Control then jumps back to step S110.

In step S330, a determination is made whether the 800 ppi pixel D is continuous tone data non-continuous tone data. If the 800 ppi pixel D is non-continuous tone data, control proceeds to step S340. Otherwise, control jumps to step S350. In step S340, the bytes A'–D' are compressed using case 10. Control then jumps back to step S110. In contrast, in step S350, the bytes A'–D' are compressed using case 11. Control then jumps back to step S110.

In step S360, a determination is made whether the 800 ppi pixel C is continuous tone data or non-continuous tone data. If the 800 ppi pixel C is determined to be non-continuous tone data, control proceeds to step S370. Otherwise, control jumps to step S400.

In step S370, a determination is made whether the 800 ppi pixel D is continuous tone data or non-continuous tone data. If the 800 ppi pixel D is non-continuous tone data, control proceeds to step S380. Otherwise, control jumps to step S390. In step S380, the bytes A'–D' are compressed using case 12. Control then jumps back to step S110. In contrast, in step S390, the bytes A'–D' are compressed using case 13. Control then jumps back to step S110.

In step S400, a determination is made whether the 800 ppi pixel D is continuous tone data non-continuous tone data. If the 800 ppi pixel D is non-continuous tone data, control proceeds to step S410. Otherwise, control jumps to step S420. In step S410, the bytes A'–D' are compressed using case 14. Control then jumps back to step S110. In contrast, in step S420, the bytes A'–D' are compressed using case 15. Control then jumps back to step S110.

Figure 26:
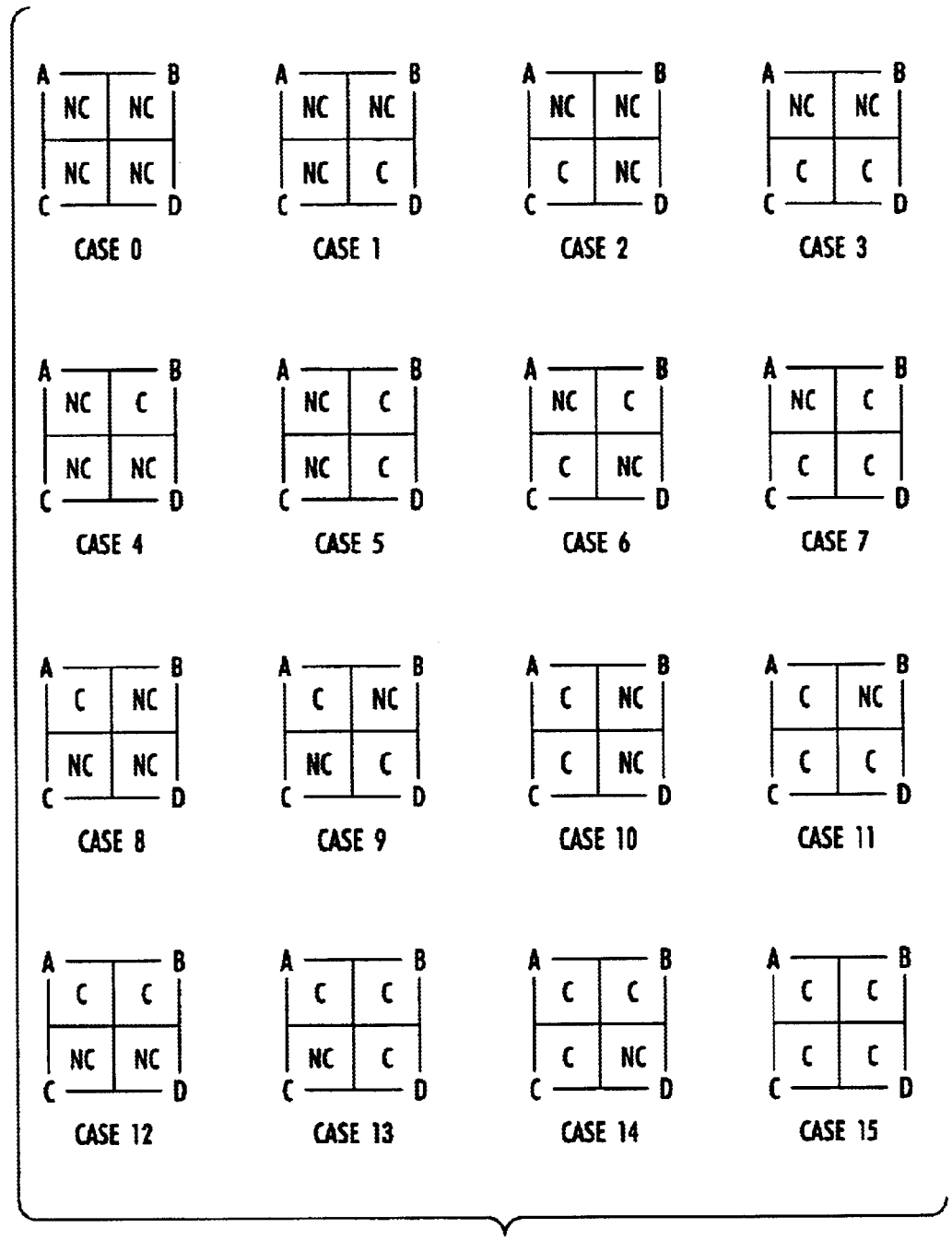
FIG. 26 illustrates the 16 potential cases, 0–15, that can occur during compression.

FIG. 26 shows the particular status, continuous tone or non-continuous tone, for each of the 800 ppi pixels A–D, contained in the bytes A'–D', respectively, corresponding to each of the sixteen cases 0–15.

As illustrated in FIG. 26, case 0 corresponds to an image region including the 800 ppi pixels A, B, C and D that are all non-continuous tone data. Case 1 corresponds to an image region containing non-continuous tone data in the 800 ppi pixels A, B and C and continuous tone data in the 800 ppi pixel D. Case 2 corresponds to an image region in which the 800 ppi pixels A, B, and D are continuous tone data and the 800 ppi pixel C is non-continuous tone data. Case 3 corresponds to an image region containing non-continuous tone data for the 800 ppi pixels A and B and continuous tone data for the 800 ppi pixels C and D. Case 4 corresponds to an image region in which the 800 ppi pixels A, C and D are non-continuous tone data and the 800 ppi pixel B is continuous tone data. Case 5 includes the 800 ppi pixels A and C, which are non-continuous tone data, and the 800 ppi pixels B and D, which are continuous tone data. Case 6 corresponds to an image including the continuous tone 800 ppi pixels B and C and the non-continuous tone 800 ppi pixels A and D. Case 7 corresponds to an image region in which the 800 ppi pixels B, C and D are continuous tone data and the 800 ppi pixel A is non-continuous tone data.

Case 8 corresponds to an image region in which the 800 ppi pixels B, C and D are non-continuous tone data and the 800 ppi pixel A is continuous tone data. Case 9 corresponds to an image region including the non-continuous tone 800 ppi pixels B and C and the continuous tone 800 ppi pixels A and D. Case 10 corresponds to an image region in which the 800 ppi pixels A and C are continuous tone data and the 800 ppi pixels B and D are non-continuous tone data. Case 11 corresponds to an image region including continuous tone 800 ppi pixels A, C and D and the non-continuous tone 800 ppi pixel B. Case 12 corresponds to an image region in which the 800 ppi pixels A and B are continuous tone data and the 800 ppi pixels C and D are non-continuous tone data. Case 13 corresponds to an image region including the continuous tone 800 ppi pixels A, B and D and the non-continuous tone 800 ppi pixel C. Case 14 corresponds to an image region in which the 800 ppi pixels A, B and C are continuous tone data and the 800 ppi pixel D is non-continuous tone data. Case 15 corresponds to an image region in which all of the 800 ppi pixels A–D are continuous tone data.

Figure 10:
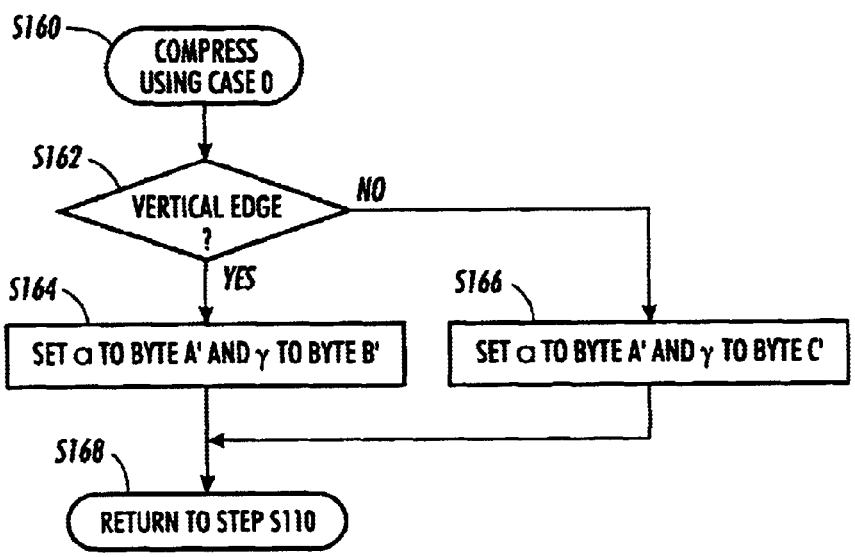

FIG. 10 outlines in greater detail one exemplary embodiment of the compression step SI 60. As shown in FIG. 10, compression using case 0 involves determining if an edge located in the quadrant containing the 800 ppi pixels A, B, C and D is vertical or horizontal. Therefore, beginning in step S160, control continues to step S162, in which the data indicative of the 800 ppi pixel A is used to determine if an edge located in the quadrant is vertical or horizontal. This is performed by analyzing the byte A' to determine if the direction bit $B_1$ of the byte A' is indicative of a horizontal or vertical edge.

Analysis of any of the bytes A', B', C' or D' may be performed to determine the orientation of an edge contained in the quadrant. For example, in cases, described below, when the 800 ppi pixel A is continuous tone data, as in case 8 discussed below with respect to FIG. 18, the byte A' will not contain a direction bit because bit $B_1$ is a portion of the image data defining the appropriate gray level for continuous tone pixel A. Therefore, for case 8, the process must refer to an alternate data byte to determine the orientation of an edge in the quadrant.

Returning to compression using case 0, if in step S162, a determination is made that the direction bit $B_1$ of the byte A' indicates a horizontal edge, control proceeds to step S164. Otherwise, control jumps to step S166. In step S164, a three-bit value indicative of the image value of the 800 ppi pixel A is extracted from the byte A' for α and a three-bit value indicative of the image value of the 800 ppi pixel B is extracted from the byte B' for γ. These three-bit values define one of eight possible image values for each of the bytes A' and B'. The resulting byte of compressed data includes the bits $B_7$–$B_5$, which are indicative of the image value of the 800 ppi pixel A, the bits $B_4$–$B_2$ indicative of the image value of the 800 ppi pixel $B_1$ the direction bit $B_1$ indicating that the quadrant contains a vertical edge, and the segmentation bit $B_0$ indicating that the byte of compressed data corresponds to a quadrant containing non-continuous tone data. The resulting compressed data byte provides one of the bytes P', Q', R' or S', mentioned above and discussed in connection with the decompression process explained in detail below. Control then jumps to step S168.

Alternatively, in step S166, a three-bit value indicative of the image value of the 800 ppi pixel A is extracted from the byte A' for α and a three-bit value indicative of the image value of the 800 ppi pixel C is extracted from the byte C' for γ. The resulting byte of compressed data includes the bits $B_7$–$B_5$, which are indicative of the image value of the byte A', the bits $B_4$–$B_2$, which are indicative of the image value of the byte C', the direction bit $B_1$ indicating that the quadrant contains a horizontal edge and the segmentation bit $B_0$ indicating that the compressed data byte contains non-continuous tone data. Control then continues to step S168, where control jumps back to step S110.

Figure 11:
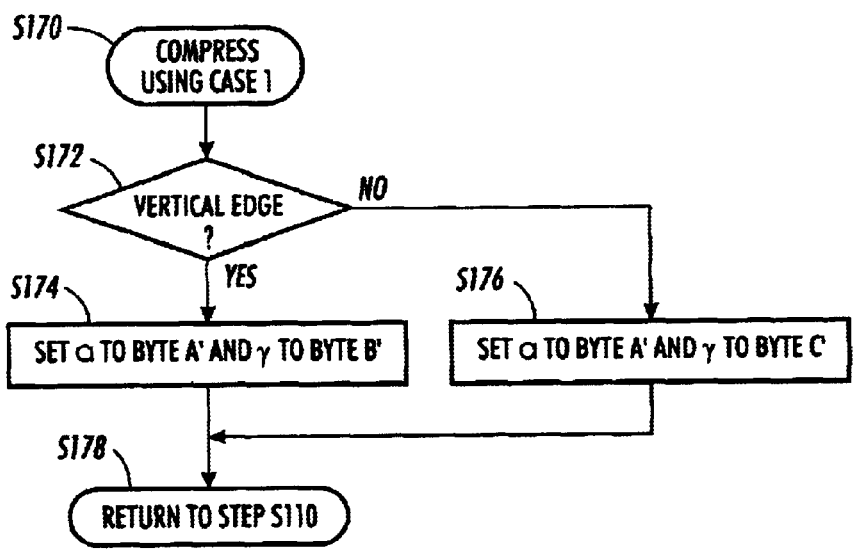

FIG. 11 outlines in greater detail one exemplary embodiment of step S170. As illustrated in FIG. 11, compression using case 1 involves determining whether the quadrant of image data contains a vertical or a horizontal edge. Therefore, beginning in step S170, control continues to step S172, in which a determination is made whether the direction bit $B_1$ of the byte A' indicates a vertical or horizontal edge. If, in step S172, a determination is made that the direction bit indicates a horizontal edge, control proceeds to step S174. Otherwise, control jumps to step S176. In step S174, a three-bit value indicative of the image value of the 800 ppi pixel A is extracted from the byte A' for α and a three-bit value indicative of the image value of the 800 ppi pixel B is extracted from the byte B' for γ. The resulting byte of compressed data includes bits $B_7$–$B_5$, which are indicative of the image value of the 800 ppi pixel A, the bits $B_4$–$B_2$, which are indicative of the image value of the 800 ppi pixel $B_1$ the direction bit $B_1$ indicating that the quadrant contains a vertical edge, and the segmentation bit $B_0$ indicative of non-continuous tone data in the compressed quadrant of image data. Control then jumps to step S178.

Alternatively, in step S176, a three-bit value indicative of the image value of the 800 ppi pixel A is extracted from the byte A' for α and a three-bit value indicative of the image value of the 800 ppi pixel C is extracted from the byte C' for γ. The resulting byte of compressed data includes the bits $B_7$–$B_5$, which are indicative of the image value of the 800 ppi pixel A, the bits $B_4$–$B_2$, which are indicative of the image value of the 800 ppi pixel C, the direction bit $B_1$ indicating that the quadrant contains a horizontal edge and the segmentation bit $B_0$ indicative of non-continuous tone data in the compressed quadrant of image data. Control then continues to step S178 where control jumps back to step S110, illustrated in FIG. 9(A).

FIG. 12 outlines in greater detail one exemplary embodiment of the compression step S180, i.e., compression using case 2. As illustrated in FIG. 12, compression using case 2 involves determining whether the quadrant contains a vertical or horizontal edge. Therefore, beginning in step S180, control continues to step S182, where a determination is made whether the direction bit indicates a vertical or horizontal edge. If, in step S182, a determination is made that the edge is vertical, control proceeds to step S184. Otherwise, control proceeds to step S186. In step S184 a three-bit value indicative of the image value of the 800 ppi pixel A is extracted from byte A' for α and a three-bit value indicative of the image value of the 800 ppi pixel B is extracted from byte B' for γ. The resulting byte of compressed data includes bits $B_7$–$B_5$, which are indicative of the image value of the 800 ppi pixel A, the bits $B_4$–$B_2$, which are indicative of the image value of the 800 ppi pixel $B_1$ the direction bit $B_1$ indicating that the quadrant contains a vertical edge and the segmentation bit $B_0$ indicative of non-continuous tone data in the compressed quadrant of image data. Control then jumps to step S188. Alternatively, in step S186, a three-bit value indicative of the image value of the 800 ppi pixel A is extracted from the byte A' for α. However, because the 800 ppi pixel C is continuous tone data rather than non-continuous tone data, the image value of γ cannot be provided based on the image value of the 800 ppi pixel C. Therefore, an image value for γ must be synthesized from other data in the quadrant. However, special considerations regarding the gradient of the image data must be taken into consideration during fabricating an image value for γ.

The synthesized γ value must be set to either a saturation level, i.e., completely exposed, or a nullification value, i.e., completely unexposed, based on the relative values and characteristics of the pixels in the image region. For example, if the 800 ppi pixel A has an image value that is above a printing threshold level value, for example, an image value of level 128 of the 256 levels available, and the 800 ppi pixel C is continuous tone data, then γ, representing the image value of an 800 ppi pixel that is adjacent to an exposed non-continuous tone pixel A and adjacent to a continuous tone pixel C, should have an intensity that corresponds with a gradient that is decreasing towards the continuous tone pixel C from the exposed pixel A. Alternatively, if the 800 ppi pixel A has an image value that is below the threshold value and the 800 ppi pixel C is continuous tone data, then γ should have an image value that corresponds to a gradient that increases towards the continuous tone pixel C from the exposed non-continuous tone pixel A. Therefore, to produce an accurate image, the compression methods, according to this invention, should not alter the gradient of the original image data. Therefore, as a matter of convention, an operation must be performed to ensure that a synthesized value for γ does not produce a change in the gradient from either an ascending or a descending direction.

As shown in appendix A, operation M28 is one example of such an operation for performing this synthesis. If a byte of data to be analyzed indicates a pixel value that is higher than the printing threshold level value, then operation M28 returns an image value that is saturated. Alternatively, if the byte of data being analyzed indicates a pixel value that is lower than the printing threshold level value, then operation M28 returns an image value that is nullified.

Therefore, performing operation M28 on the byte C', as set forth in step S186, results in a byte of compressed data that includes the bits $B_7$–$B_5$, which are indicative of the image value of pixel A, the bits $B_4$–$B_2$, which are provided by applying the operation M28 to the 800 ppi pixel C, the direction bit $B_1$ indicating that the quadrant contains a horizontal edge, and the segmentation bit $B_0$ indicative of non-continuous tone data in the compressed quadrant of image data. Control then continues to step S188, where control jumps back to step S110, illustrated in FIG. 9(A).

FIG. 13 outlines in greater detail one exemplary embodiment of the compression step S190, i.e., compression using case 3. As illustrated in FIG. 13, compression using case 3 involves determining whether the quadrant contains a vertical or horizontal edge. Therefore, beginning in step S190, control continues to step S192, where a determination is made whether the direction bit indicates a vertical or horizontal edge. If, in step S192, a determination is made that the edge is vertical, control proceeds to step S194. In step S194 a three-bit value indicative of the image value of the 800 ppi pixel A is extracted from byte A' for α and a three-bit value indicative of the image value of the 800 ppi pixel B is extracted from byte B' for γ. The resulting byte of compressed data includes bits $B_7$–$B_5$, which are indicative of the image value of the 800 ppi pixel A, the bits $B_4$–$B_2$, which are indicative of the image value of the 800 ppi pixel $B_1$ the direction bit $B_1$ indicating that the quadrant contains a vertical edge and the segmentation bit $B_0$ indicative of non-continuous tone data in the compressed quadrant of image data. Control then jumps to step S198.

Alternatively, in step S196, a three-bit value indicative of the image value of the 800 ppi pixel A is extracted from the byte A' for α and operation M28 is performed on the byte A' to provide a three-bit value for γ. Step S196 results in a byte of compressed data that includes the bits $B_7$–$B_5$, which are indicative of the image value of pixel A, the bits $B_4$–$B_2$, which are provided by applying the operation M28 to the 800 ppi pixel A, the direction bit $B_1$ indicating that the quadrant contains a horizontal edge, and the segmentation bit $B_0$ indicative of non-continuous tone data in the compressed quadrant of image data. Control then continues to step S198, where control jumps back to step S110, illustrated in FIG. 9(A).

Figure 14:
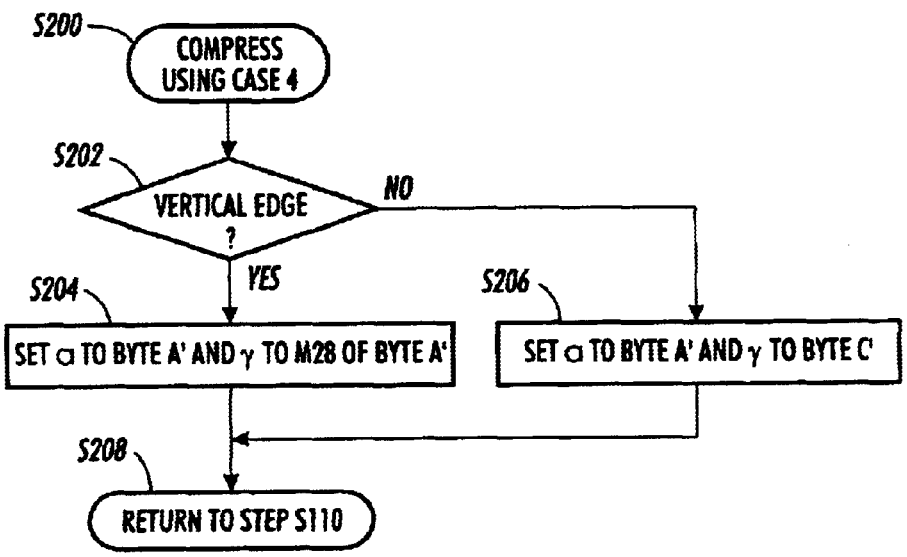

FIG. 14 outlines in greater detail one exemplary embodiment of the compression step S200, i.e., compression using case 4. As illustrated in FIG. 14, compression using case 4 involves determining whether the quadrant contains a vertical or horizontal edge. Therefore, beginning in step S200, control continues to step S202, where a determination is made whether the direction bit indicates a vertical or horizontal edge. If, in step S202, a determination is made that the edge is vertical, control proceeds to step S204. Otherwise, control proceeds to step S206. In step S204, three-bits indicative of the image value of the 800 ppi pixel A are extracted from byte A' for α, while the M28 operation is performed on the byte A' to provide a quantity for γ. As a result, in step S204, a compressed data byte is provided that includes bits $B_7$–$B_5$, which are indicative of the image value of the 800 ppi pixel A, the bits $B_4$–$B_2$, which are provided by applying the operation M28 on the 800 ppi pixel A, the direction bit $B_1$ indicating that the quadrant contains a vertical edge, and the segmentation bit $B_0$ indicating that the compressed data byte contains non-continuous tone data. Control then jumps to step S208.

In contrast, in step S206, a three-bit value indicative of the image value of the 800 ppi pixel A is extracted from the byte A' for α and a three-bit value indicative of the image value of the 800 ppi pixel C is extracted from the byte C' for γ. Step S206 results in a byte of compressed data that includes the bits $B_7$–$B_5$, which are indicative of the image value of the 800 ppi pixel A, the bits $B_4$–$B_2$, which are indicative of the image value of the 800 ppi pixel C, the direction bit $B_1$ indicating that the quadrant contains a horizontal edge, and the segmentation bit $B_0$ indicative of non-continuous tone data in the compressed quadrant of image data. Control then continues to step S208, where control jumps back to step S110, illustrated in FIG. 9(A).

Figure 15:
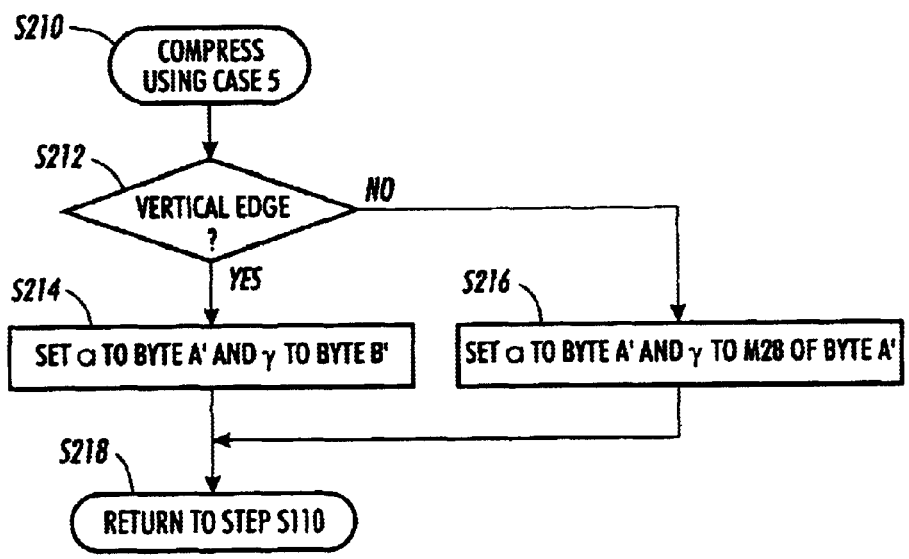

FIG. 15 outlines in greater detail one exemplary embodiment of the compression step S210, i.e., compression using case 5. As illustrated in FIG. 15, compression using case 5 involves determining whether the quadrant contains a vertical or horizontal edge. Therefore, beginning in step S210, control continues to step S212, where a determination is made whether the direction bit indicates a vertical or horizontal edge. If, in step S212, a determination is made that the edge is vertical, control proceeds to step S214. Otherwise, control proceeds to step S216. In step S214, three-bits indicative of the image value of the 800 ppi pixel A are extracted from the byte A for α and the operation M28 is performed on the byte A' to provide a three-bit value for γ. The resulting byte of compressed data includes bits $B_7$–$B_5$, which are indicative of the 800 ppi pixel A, the bits $B_4$–$B_2$, which are provided by applying the operation M28 on the 800 ppi pixel A, the direction bit $B_1$ indicating that the quadrant contains a vertical edge, and the segmentation bit $B_0$ indicating that the quadrant contains non-continuous tone data. Control then jumps to step S218

In contrast in step S216, a three-bit value indicative of the image value of the 800 ppi pixel A is extracted from byte A' for α, while the operation M28 is performed on the byte A' to provide a three-bit quantity for γ. The resulting byte of compressed data includes the bits $B_7$–$B_5$, which are indicative of the image value of pixel A, the bits $B_4$–$B_2$, which are provided by applying the operation M28 on pixel A, the direction bit $B_1$ indicating that the quadrant contains a horizontal edge, and the segmentation bit $B_0$ indicating that the quadrant contains non-continuous tone data. Control then proceeds to step S218, where control jumps back to step S110, illustrated in FIG. 9(A).

FIG. 16 outlines in greater detail one exemplary embodiment of the compression step S220, i.e., compression using case 6. As illustrated in FIG. 16, although compression using case 6 involves determining whether the quadrant contains a vertical or horizontal edge, the determination of image values for α and γ does not change based on the direction of the edge in the quadrant. However, the compressed data byte produced by the compression indicates whether the quadrant of data contains a vertical or horizontal edge. Therefore, beginning in step S220, control continues to step S222, where a determination is made whether the direction bit indicates a vertical or horizontal edge. If, in step S222, a determination is made that the edge is vertical, control proceeds to step S224. Otherwise, control proceeds to step S226.

In step S224, a three-bit value indicative of the image value of the 800 ppi pixel A is extracted from byte A' for α and the operation M28 is performed on the byte A' to provide a three-bit value for γ. The resulting byte of compressed data includes the bits $B_7$–$B_5$, which are indicative of the 800 ppi pixel A, the bits $B_4$–$B_2$, which are indicative of the operation M28 performed on the byte A', the direction bit $B_1$ indicating that the quadrant contains a vertical edge, and the segmentation bit $B_0$ indicating that the quadrant contains non-continuous tone data. Control then proceeds to step S228.

In step S226 the resulting compressed data byte is not changed significantly because both the 800 ppi pixels B and C are continuous tone data. As a result, during compression, quantities associated with the bytes B' and C' must be synthesized using the M28 operation. Therefore, in step S226, a three-bit value indicative of the image value of the 800 ppi pixel A is extracted from byte A' for α and the operation M28 is performed on the byte A' to provide a three-bit value for γ. The resulting byte of compressed data includes the bits $B_7$–$B_5$, which are indicative of the 800 ppi pixel A, the bits $B_4$–$B_2$, provided by performing the operation M28 on the 800 ppi pixel A, the direction bit $B_1$ indicating that the quadrant contains a horizontal edge and the segmentation bit $B_0$ indicating that the quadrant contains non-continuous tone data. Control then proceeds to step S228 where control jumps back to step S110, illustrated in FIG. 9(A).

FIG. 17 outlines in greater detail one exemplary embodiment of the compression step S230, i.e., compression using case 7. As illustrated in FIG. 17, compression using case 7 does not alter the determination of image values for the α and γ nibbles based on whether the quadrant contains a vertical or horizontal edge. In this exemplary embodiment of the compression method according to the invention, compression using cases 6 and 7 provide identical compressed data bytes because the only difference between cases 6 and 7 is whether pixel D is continuous tone or non-continuous tone data. That portion of the illustrative compression process using cases 6 and 7 does not refer to the nature of the 800 ppi pixel D, which is contained in the byte D', when compressing the data contained in a data quadrant. Therefore, any change in the nature of the data contained in the byte D' does not affect the resulting values produced by the compression process. However, as discussed below, compression using other cases refers to the content of the byte D' during compression.

Therefore, beginning in step S230, control continues to step S232, where a determination is made whether the direction bit indicates a vertical or horizontal edge. If, in step S232, a determination is made that the edge is vertical, control proceeds to step S234. Otherwise, control proceeds to step S236. In step S234, a three-bit value indicative of the image value of the 800 ppi pixel A is extracted from byte A' for α and the operation M28 is performed on the byte A' to provide a three-bit value for γ. The resulting byte of compressed data includes the bits $B_7$–$B_5$, which are indicative of the 800 ppi pixel A, the bits $B_4$–$B_2$ indicative of the operation M28 performed on the byte A', the direction bit $B_1$ indicating that the quadrant contains a vertical edge, and the segmentation bit $B_0$ indicating that the quadrant contains non-continuous tone data. Control then proceeds to step S238.

In step S236 the resulting compressed data byte is not changed significantly because both the 800 ppi pixels B and C are continuous tone data. As a result, during compression, quantities associated with the bytes B' and C' must be synthesized using the M28 operation. Therefore, in step S236, a three-bit value indicative of the image value of the 800 ppi pixel A is extracted from byte A' for a and the operation M28 is performed on the byte A' to provide a three-bit value for γ. The resulting byte of compressed data includes the bits $B_7$–$B_5$, which are indicative of the 800 ppi pixel A, the bits $B_4$–$B_2$, provided by performing the operation M28 on the 800 ppi pixel A, the direction bit $B_1$ indicating that the quadrant contains a horizontal edge and the segmentation bit $B_0$ indicating that the quadrant contains non-continuous tone data. Control then proceeds to step S238, where control jumps back to step S110, illustrated in FIG. 9(A).

FIG. 18 outlines in greater detail one exemplary embodiment of the compression step S240, i.e., compression using case 8. As illustrated in FIG. 18, compression using case 8 involves determining whether the quadrant contains a vertical or horizontal edge. Therefore, beginning in step S240, control continues to step S242, where a determination is made whether the direction bit indicates a vertical or horizontal edge. In the cases previously discussed, step S242 would normally determine whether the direction bit $B_1$ of the byte A' indicates a vertical or a horizontal edge. However, in case 8, the 800 ppi pixel A is continuous tone data. Therefore, the byte A' contains no direction bit because the byte A' indicates a halftone gray level from among 256 levels available for continuous tone data. As a result, in step S242, the direction bit of the byte D' is used to determine the direction of an edge contained in the quadrant of image data. If, in step S242, a determination is made that the edge is vertical, control proceeds to step S244. Otherwise, control proceeds to step S246.

In step S244, the byte A' is unavailable as a source of potential image values used to calculate a because the 800 ppi pixel A is continuous tone data. Therefore, the situation is very similar to that previously described in connection with compression using the case 2 and the operation M28.

However, a different operation must be used for determining a because the relative placement of α in a compressed data byte, i.e., the bits $B_7-B_5$, is different than the relative placement of γ in the compressed data byte, i.e., the bits $B_4-B_2$. Therefore, a bit-wise operation is performed to provide proper gradient orientation to synthesize α in the same way that the operation M28 synthesizes a value for γ. For convention, this operation is referred to as operation M224. The operation M224 utilizes the value 224, i.e., "11100000" in binary notation, to synthesize a proper gradient orientation for an α value when an image value cannot be extracted from a non-continuous tone data byte.

Therefore, in step S244, the operation M224 is performed on the byte C', a non-continuous tone data byte, to synthesize a three-bit quantity for α, while a three-bit quantity indicative of the image value of the 800 ppi pixel B is extracted from the byte B' for γ. The resulting compressed byte of data includes the three-bit value, resulting from applying the operation M224 to the 800 ppi pixel C, as the bits $B_7-B_5$, the bits $B_4-B_2$, which are indicative of pixel B, the direction bit $B_1$ indicating that the quadrant contains a vertical edge, and the segmentation bit $B_0$ indicating that the compressed data byte corresponds to a quadrant containing non-continuous tone data. Control then jumps to step S248.

In step S246, operation M224 is performed on the byte B' to provide a three-bit quantity for α, while a three-bit value indicative of the value of pixel C is extracted from byte C' for γ. The resulting compressed data byte includes the bits $B_7-B_5$, which are resulting from applying the operation M224 on the 800 ppi pixel $B_1$ the bits $B_4-B_2$, which are indicative of the image value of the 800 ppi pixel C, the direction bit $B_0$ indicating that the quadrant contains a horizontal edge and the segmentation bit $B_0$ indicating the compressed data byte contains non-continuous tone data. Control then jumps to step S248 where control jumps back to step S110 illustrated in FIG. 9(A).

FIG. 19 outlines in greater detail one exemplary embodiment of the compression step S250, i.e., compression using case 9. As described above in relation to compression using case 8, there is no direction bit within the byte A' because pixel A is continuous tone data. Further, in case 9, the 800 ppi pixel D is also continuous tone data. Therefore, beginning in step S250, control continues to step S252, where a determination is made whether the direction bit indicates a vertical or horizontal edge by referring to the direction bit of the byte B'. If, in step S252, a determination is made that the edge is vertical, control proceeds to step S254. Otherwise, control proceeds to step S256.

In step S254, the operation M224 is performed on the byte C' to provide a three-bit value for α, while a three-bit value indicative of the image value of the 800 ppi pixel B is extracted from byte B' for γ. The resulting compressed byte of data includes a three-bit value resulting from application of the operation M224 on the 800 ppi pixel C, the bits $B_4-B_2$, which are indicative of the image value of the 800 ppi pixel B, the direction bit $B_1$ indicating that the quadrant contains a vertical edge and the segmentation bit $B_0$ indicating the compressed data byte contains non-continuous tone data. Control then jumps to step S258.

In contrast, in step S256, the operation M224 is performed on the byte B' to provide a three-bit value for α, while a three-bit value indicative of the image value of the 800 ppi pixel C is extracted from the byte C' for γ. The resulting compressed byte of data includes bits $B_7-B_5$, which are resulting from the application of the operation M224 on the byte B', the bits $B_4-B_2$, which are indicative of the image value of the 800 ppi pixel C, the direction bit $B_1$ indicating that the quadrant contains a horizontal edge, and the segmentation bit $B_0$ indicating that the quadrant contains non-continuous tone data. Control then proceeds to step S258 where control jumps back to step 110, illustrated in FIG. 9(A).

Figure 20:
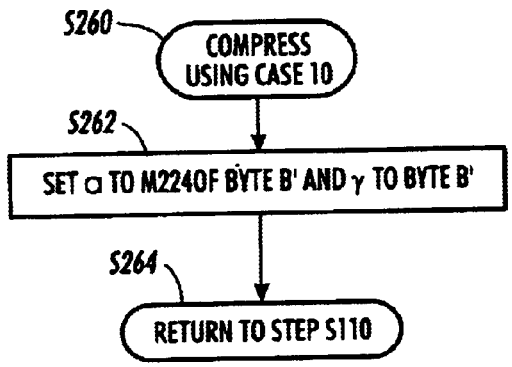

FIG. 20 outlines in greater detail one exemplary embodiment of the compression step S260, i.e., compression using case 10. As illustrated in FIG. 20, compression using case 10 does not involve determining whether the quadrant contains a vertical or horizontal edge. That is, the compressed data byte is not dependent on the direction of the edge in the quadrant. Therefore, beginning in step S260, control continues to step S262, where the operation M224 is performed on the byte B' to synthesize a three-bit quantity for α, while a three-bit quantity indicative of the image value of the 800 ppi pixel B is extracted from the byte B' for γ. The direction bit $B_1$ is set to indicate a vertical edge for convenience.

The resulting compressed data byte includes the bits $B_7-B_5$, which result from the application of the operation M224 on the 800 ppi pixel B, the bits $B_4-B_2$, which are indicative of the image value of the 800 ppi pixel B, the direction bit $B_1$ indicating that the quadrant contains a vertical edge and the segmentation bit indicating non-continuous tone data. Control then proceeds to step S264 where control returns to step S110, illustrated in FIG. 9(A).

Figure 21:
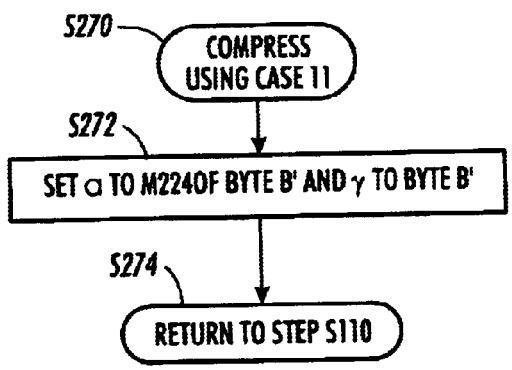

FIG. 21 outlines in greater detail one exemplary embodiment of the compression step S270, i.e., compression using case 11. Similarly to compression using case 10, step S270 does not alter process steps based on the direction bits within bytes A', B', C', or D'. The difference between case 10 and case 11 is whether the 800 ppi pixel D is non-continuous tone data, as in case 10 or continuous tone data, as in case 11. Therefore, there is no difference between the compressed bytes produced by compression using case 10 and compression using case 11 because the illustrative examples of the compression process for these particular cases do not refer to the nature of byte D'.

Therefore, beginning in step S270, control proceeds to step S272 where the operation M224 is performed on the byte B' to provide a three-bit value for α, while a three-bit quantity indicative of the image value of the 800 ppi pixel B is extracted from byte B' for γ. Similarly to case 10, the direction bit associated with the compressed byte indicates a vertical edge and the segmentation bit is indicative of non-continuous tone data. Therefore, the compressed data byte resulting from case 11 is comprised of the bits $B_7-B_5$, which result from application of the operation M224 on the 800 ppi pixel B, the bits $B_4-B_2$, which are indicative of the image value of the 800 ppi pixel B, the direction bit $B_1$ indicating that the quadrant contains a vertical edge and the segmentation bit $B_0$ indicating that the quadrant contains non-continuous tone data. Control then proceeds to step S274 where control jumps back to step S110, illustrated in FIG. 9(A).

Figure 22:
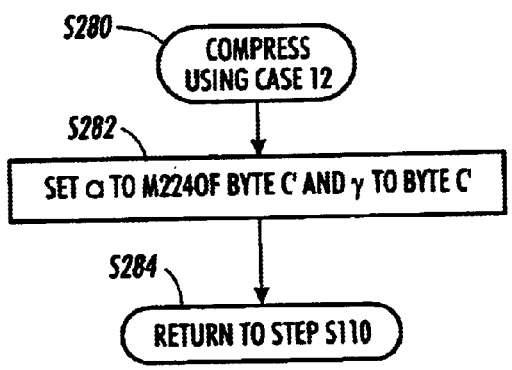

FIG. 22 outlines in greater detail one exemplary embodiment of the compression step S280, i.e., compression using case 12. As illustrated in FIG. 22, compression using case 12 does not involve determining whether the quadrant contains a vertical or horizontal edge. Direction bit analysis is not performed in compression using case 12. Rather, the direction bit is set to indicate a horizontal edge for convenience.

Therefore, beginning in step S280, control continues to step S282, where the operation M224 is performed on the byte C' to synthesize a three-bit quantity for α, while a three-bit quantity indicative of the image value of the 800 ppi pixel C is extracted from the byte C' for γ. The resulting compressed data byte includes the bits $B_7$–$B_5$, which result from the application of the operation M224 on the 800 ppi pixel C, the bits $B_4$–$B_2$, which are indicative of the image value of the 800 ppi pixel C, the direction bit $B_1$ indicating that the quadrant contains a horizontal edge and the segmentation bit indicating non-continuous tone data. Control then proceeds to step S284 where control returns to step S110, illustrated in FIG. 9(A).

Figure 23:
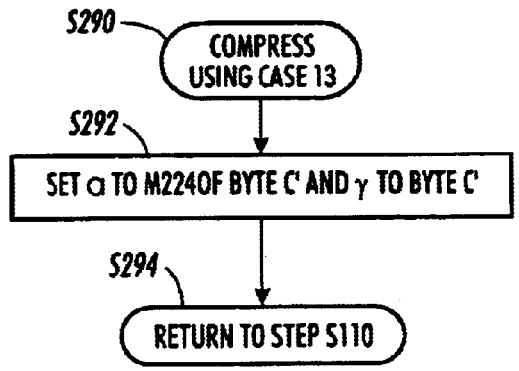

FIG. 23 outlines in greater detail one exemplary embodiment of the compression step S290, i.e., compression using case 13. Compression using case 13 is similar to compression using case 12 in that compression using case 13 does not perform direction bit analysis. Rather, the direction bit is set to indicate a horizontal edge. Therefore, beginning in step S290, control continues to step S292, where the operation M224 is performed on the byte C' to synthesize a three-bit quantity for α, while a three-bit quantity indicative of the image value of the 800 ppi pixel C is extracted from the byte C' for γ. The resulting compressed data byte includes the bits $B_7$–$B_5$, which result from the application of the operation M224 on the 800 ppi pixel C, the bits $B_4$–$B_2$, which are indicative of the image value of the 800 ppi pixel C, the direction bit $B_1$ indicating that the quadrant contains a horizontal edge and the segmentation bit indicating non-continuous tone data. Control then proceeds to step S294 where control returns to step S110, illustrated in FIG. 9(A).

Figure 24:
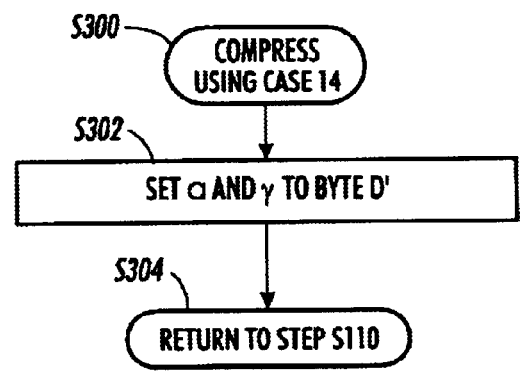

FIG. 24 outlines in greater detail one exemplary embodiment of the compression step S300, i.e., compression using case 14. Compression using case 14 is similar to compression using cases 10–13 in that compression using case 14 does not perform direction bit analysis. Rather, the direction bit is set to indicate a horizontal edge. Therefore, beginning in step S300, control continues to step S302, where three-bit values indicative of the image value of the 800 ppi pixel D are extracted from byte D', the only non-continuous tone data byte within the image quadrant, for α and as γ. The resulting compressed data byte includes the bits $B_7$–$B_5$, which are indicative of the image value of the 800 ppi pixel D, the bits $B_4$–$B_2$, which are also indicative of the image value of the 800 ppi pixel D, the direction bit $B_1$ indicating that the quadrant contains a horizontal edge and the segmentation bit indicating non-continuous tone data. Control then proceeds to step S294 where control returns to step S110, illustrated in FIG. 9(A).

Figure 25:
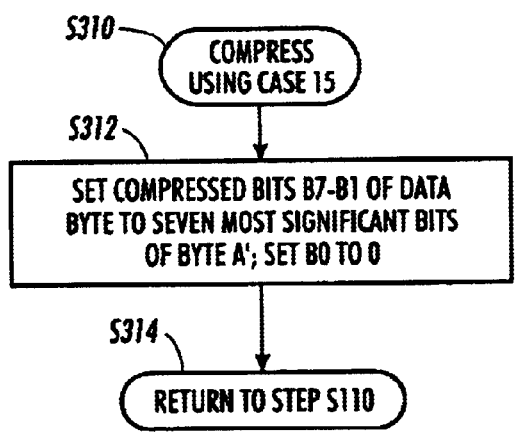

FIG. 25 outlines in greater detail one exemplary embodiment of the compression step S310, i.e., compression using case 15. In particular, step S310 is reached only when all of the 800 ppi pixels A–D of the block of image data are continuous tone pixels. Thus, beginning in step S310, control proceeds to step S312. As with compression using cases 10–14, compression using case 15 does not perform direction bit analysis. Rather, in step S312, the seven most significant bits of the resulting compressed byte of data are assigned the image values of the seven most-significant bits of the byte A'. Compression is not performed to include a direction bit in the byte because the quadrant contains all continuous tone data. Rather, the resulting byte of compressed data includes the bits $B_7$–$B_1$, indicative of a gray scale value of the byte A' and the segmentation bit $B_0$ is set to 0 indicative of continuous tone data. Then, in step S424, control jumps back to step S110, illustrated in FIG. 9(A).

Compressing a bytemap using the above-described exemplary embodiment of the compression methods of this invention produces a bytemap of compressed image data, in which each byte indicates a quadrant of an image region rather than a single pixel. The compressed data bytes each contain segmentation bits that indicate that whether the byte contains non-continuous tone data, as in compression using cases 0–14, or only continuous tone data, as in compression using case 15. However, the compressed data bytes of non-continuous tone do not distinguish between cases 0–14. Therefore, the compression method replaces the distinction between quadrants containing various combinations of non-continuous tone and continuous tone data with a distinction between quadrants that contain non-continuous tone data and quadrants that contain continuous tone data. Therefore, the distinction between the various combinations of non-continuous tone data and continuous tone data is eliminated. This result is obtained because the segmentation bit $B_0$ is the only indication of whether the compressed data byte contains continuous tone data or non-continuous tone data.

As should be apparent from the above-outlined discussion, the image data used to produce the compressed bytemap is significantly diminished relative to the image data available in the uncompressed bytemap. The compression process is beneficial in reducing the necessary amount of information to be stored in memory while providing a high spatial resolution bytemap in particular directions of two-dimensional image data for non-continuous tone data. However, the compression process and corresponding decompression processes are part of a lossy compression scheme.

Figure 27A:
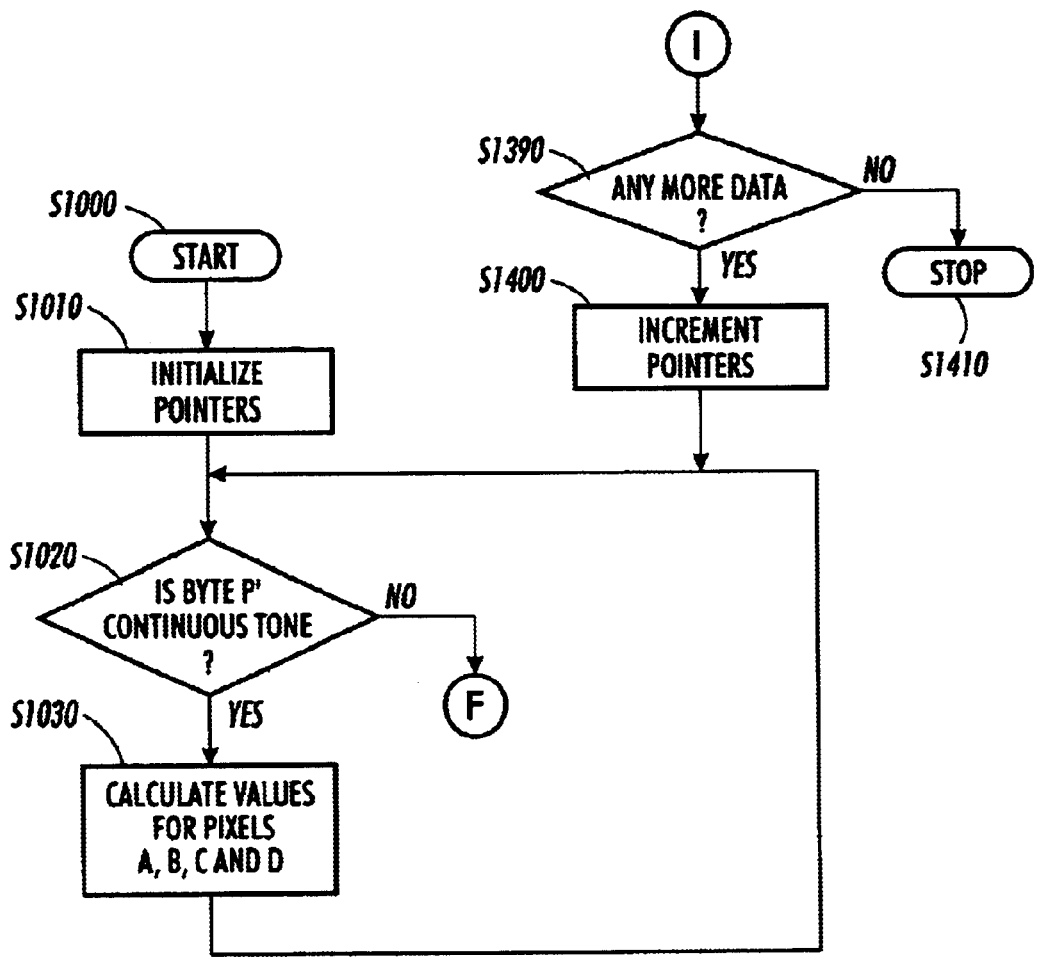
FIGS. 27(A)–27(F) illustrate an exemplary embodiment of the compression process.

FIGS. 27(A)–27(F) illustrate one exemplary embodiment of the decompression systems and methods of this invention. As shown in FIG. 27(A), beginning in step S1000, control proceeds to step S1010. In step S1010, pointers for decompressing a first byte of compressed data are set up. These pointers include the source pointer, "SRCPTR", the offset pointer, "OFSETPTR", the next pointer, "NXTPTR", and the last pointer, "LSTPTR", as illustrated in FIGS. 4 and 5.

As shown in FIG. 4, last pointer, "LSTPTR", is located adjacent to the quadrant corresponding to the compressed data byte P' identified by the source pointer, "SRCPTR". As shown in FIG. 4, the compressed data byte P' is a target quadrant to be decompressed. Therefore, the compressed data byte P' contains data necessary to form the decompressed 800 ppi pixels A, B, C and D regardless of whether those pixels are non-continuous tone data or continuous tone data. The bytes Q', R' and S' similarly contain compressed data and are decompressed following decompression of the data of the byte P' as the pointers are incremented to move to the right and down from the present position of the source pointer, "SRCPTR". The quadrant of image data corresponding to the byte R' is identified by the next pointer, "NXTPTR", position. The quadrant of the image data corresponding to the byte U is located at the position identified by last pointer, "LSTPTR".

FIG. 5 is an enlarged view of a portion of FIG. 4. FIG. 5 also illustrates the offset pointer, "OFSETPTR", which is used to locate the 800 ppi pixels A, B, C and D within the quadrant of image data as discussed below. In FIG. 5, the bytes P', Q', R' and S' are the bytes of compressed image data corresponding to quadrants I–IV. It is important to understand that the bytes of compressed data P', Q', R' and S' each correspond to the bytes of compressed data produced by the compression method described above. Accordingly, if these bytes of data P', Q', R' and S' contain non-continuous tone data, each byte contains two nibbles of data, each nibble explicitly defining a gray value for one 800 ppi pixel.

However, based on the direction bit of the compressed data byte and information contained in surrounding compressed data bytes, the decompression process synthesizes values for additional 800 ppi pixels in the quadrant, referred to as "synthesized pixels". These synthesized pixels improve the spatial resolution of the non-continuous tone data in the bytemap in a low spatial resolution direction. This decompression process is preferably performed on data compressed using the compression process described above, and illustrated in FIGS. 9(A)–25.

As set forth above, step S1010 defines the spatial relationships between the bytes P', Q', R', S', U' and V', the temporary pixels P, Q, R and S and pointers LSTPTR, SRCPTR, NXTPTR and OFSETPTR illustrated in FIGS. 4 and 5. Then, in step S1020, a determination is made whether the byte P' contains continuous tone data. Referring to the compression process described above, the byte P' is continuous tone data if, for example, it is the result of compression using case 15. Alternatively, compression using any of the other cases 0–14 produces compressed bytes of image data that are non-continuous tone data. As above, compression using case 15, illustrated in FIG. 25, provides a byte of compressed image data with the segmentation bit $B_0$ indicating continuous tone data. During decompression, the segmentation bit is checked to determine whether the byte to be decompressed contains continuous tone data or non-continuous tone data.

If, during step S1020, the byte P' is determined to contain continuous tone data, control proceeds to step S1030. Otherwise control jumps to step S1040.

In step S1030, values for the continuous tone 800 ppi pixels A, B, C and D are determined from the image values contained in the bytes P', Q', R' and S'. Although decompressing the continuous tone compressed data byte produces the 800 ppi pixels A, B, C and D, the image values of the 800 ppi pixels are based on the single gray level values contained in one of the bytes P', Q', R' or S'. For example, if the compressed byte P' contains continuous tone data, then quadrant I contains continuous tone data. As a result, image values associated with 800 ppi pixels A, B, C and D of quadrant I are replicated from the compressed data byte P'. For example, in step S1030, the image values of the 800 ppi pixels A, B, C and D are set equal to the image value contained in the byte P'.

Figure 27B:
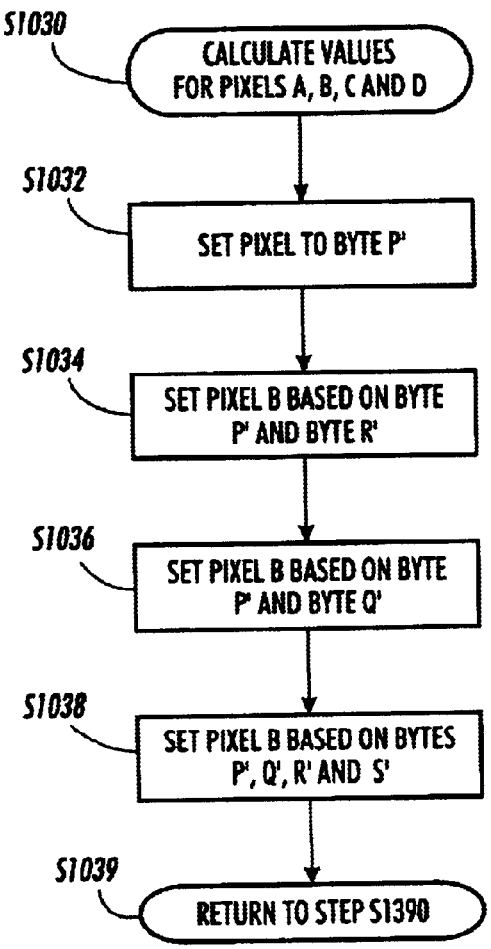

Alternatively, step S1030 may replicate image values for the 800 ppi pixels by averaging values contained in the compressed data byte. For example, as shown in FIG. 27(B), control may begin in step S1030 and proceed to step S1032. In step S1032, an image value for an 800 ppi pixel A may be set equal to the image value contained in the byte P'. Then, in step S1034, the image value for the 800 ppi pixel B may be set equal to the average of the image values contained in the byte P' and the byte R'. Next, in step S1036, the image value for the 800 ppi pixel C may be set equal to the average of the image values contained in the byte P' and the byte Q'. In step S1038, the image value for the 800 ppi pixel D may be set equal to the average of the image values of the bytes P', Q', R' and S'. Subsequently, control proceeds to step S1039, where control jumps to step S1390.

Figure 27C:
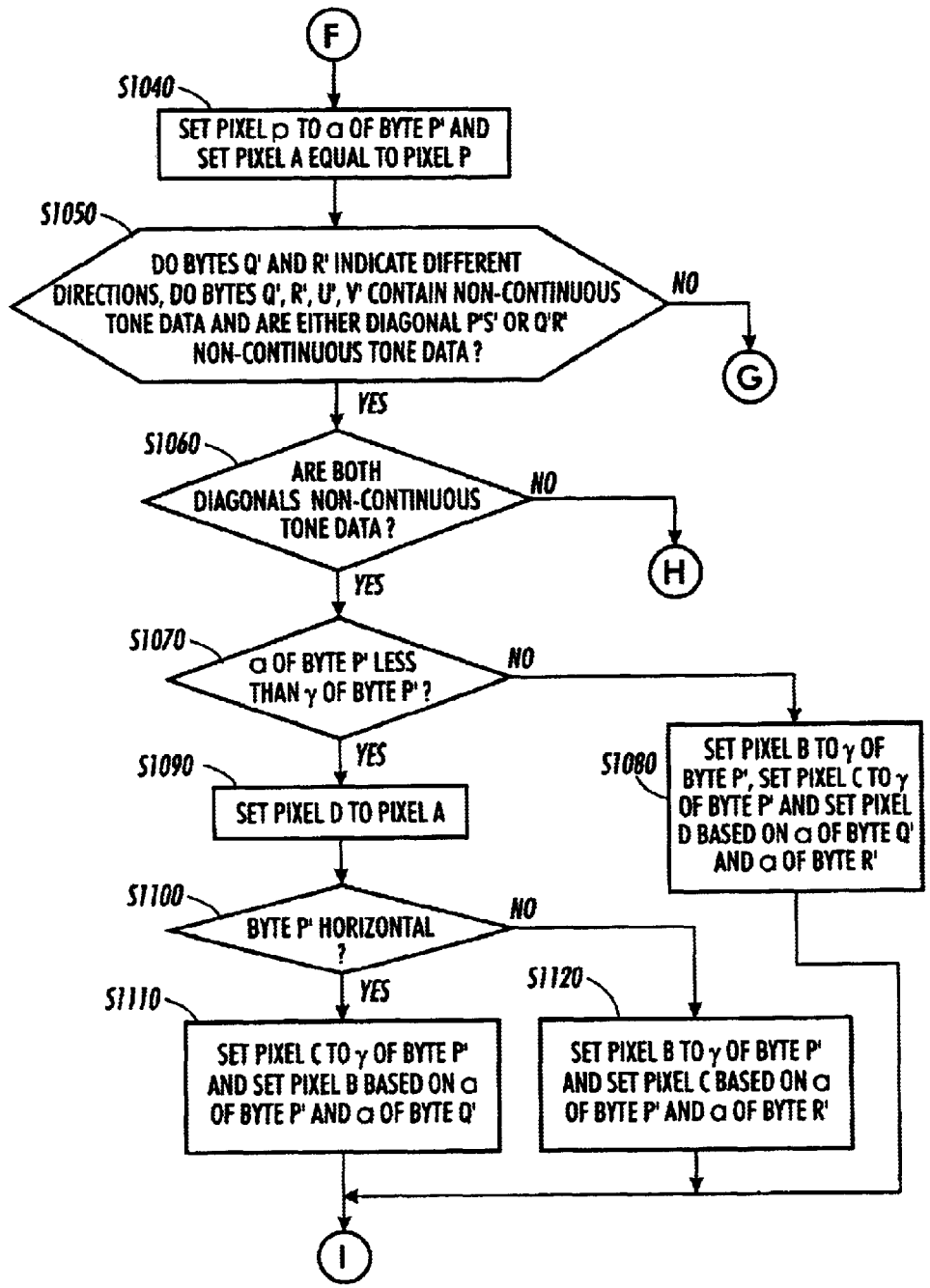

In contrast, in step S1040, illustrated in FIG. 27(C), an image value for a temporary pixel P is set equal to a of the byte B', an image value of the 800 ppi pixel A is set equal to the image value of the temporary pixel P. Control then proceeds to step S1050. The temporary pixels P, Q, R, S, RS and QS are the temporary pixels used during decompression to calculate the image values for the 800 ppi pixels A, B, C and D. The temporary pixels P, Q, R and S are located at the corners of the image region illustrated in FIGS. 2 and 3 and correspond to αP, αQ, αR and αS in FIGS. 2 and 3.

In step S1050, a determination is made whether the bytes Q' and R' have direction bits that indicate different directions, whether the bytes Q', R', U' and V' all contain segmentation bits that indicate non-continuous tone data and whether the one of the diagonals P'S' and Q'R' contain non-continuous tone data. If, in step S1050, a determination is made that the bytes Q' and R' indicate edges of different directions, the bytes Q', R', U' and V' contain non-continuous tone data and either diagonal P'S' or Q'R' is non-continuous tone data, control proceeds to step S1060. Otherwise, if any one of these determinations is false, control jumps to step S1130.

In step S1060, a determination is made whether the data contained in both of the bytes P' and S' or the data contained in both of the bytes Q' and R', i.e., the diagonals P'S' and Q'R', is non-continuous tone data. If bytes along both of the diagonals contain non-continuous tone data, control proceeds to step S1070. Otherwise, control jumps to step S1330.

In step S1070, the determination is made whether the α nibble of the byte P' is less than the γ nibble of the byte P'. If the α nibble is less than the γ nibble, control proceeds to step S1080. Otherwise, control jumps to step S1090.

In step S1080, the image value of the 800 ppi pixel B is set equal to the value of the γ nibble of the byte P', the image value of the 800 ppi pixel C is set equal to the value of the γ nibble of the byte P', the image value of 800 ppi pixel D is set based on the values of the α nibbles of the byte Q' and the byte R', for example, the values of the α nibbles are averaged. Control then proceeds to step S1390, illustrated in FIG. 27(A).

In step S1090, the image value of the 800 ppi pixel D is set equal to the image value of the 800 ppi pixel A. Then, in step S1100, a determination is made whether the direction bit $B_1$ of the byte P' indicates that quadrant I contains a vertical or horizontal edge. If the direction bit $B_1$ indicates a horizontal edge, control proceeds to step S110. Otherwise, control jumps to step S1120.

In step S1110, the image value of the 800 ppi pixel C is set equal to the γ nibble of the byte P' and the image value of the 800 ppi pixel B is set based on the a nibble of the byte P' and the α nibble of the byte Q', e.g., the α nibble values are averaged. Control then proceeds to step S1390, illustrated in FIG. 27(A).

In contrast to both steps S100 and S1110, in step S1120, the image value of the 800 ppi pixel B is set equal to the γ nibble of the temporary pixel P, the image value of the 800 ppi pixel C is set based on the α nibble of the byte P' and the α nibble of the byte R', for example, the values of the α nibbles of the bytes P' and R' are averaged. Control then proceeds to step S1390, illustrated in FIG. 27(A).

Figure 27D:
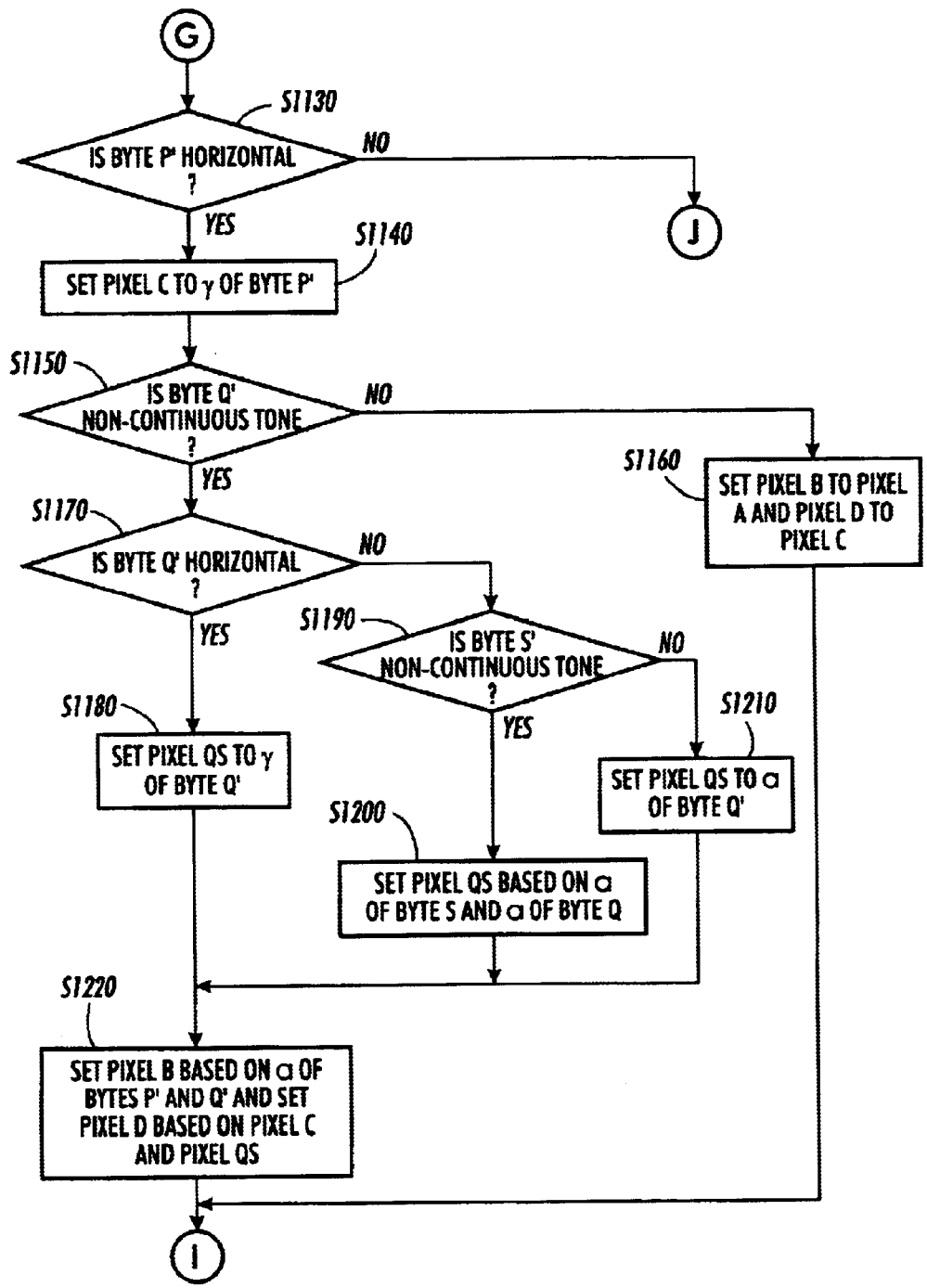

In step S130, illustrated in FIG. 27(D), a determination is made whether the direction bit $B_1$ of the byte P' indicates that quadrant I contains a vertical or a horizontal edge. If, instep S1130, the direction bit $B_1$ indicates a horizontal edge, control proceeds to step S1140. Otherwise, control jumps to step S1230.

In step S1140, the image value of the 800 ppi pixel C is set equal to the value of the γ nibble of the byte P'. Then, in step S1150, a determination is made whether the byte Q' contains non-continuous tone data or continuous tone data. If, in step S1150, the byte Q' is determined to contain non-continuous tone data, control proceeds to step S1170. Otherwise, control jumps to step S1160.

In step S1160, the image value of the 800 ppi pixel B is set equal to the image value of the 800 ppi pixel A, and the image value of the 800 ppi pixel D is set equal to the image value of the 800 ppi pixel C. Control then proceeds to step S1390.

In step S1170, a determination is made whether the direction bit $B_1$ indicates that quadrant I contains a horizontal or vertical edge. If, in step S1170, the direction bit $B_1$ of the byte Q' indicates a horizontal edge, control proceeds to step S1180. Otherwise, control jumps to step S1190.

In step S1180, the image value of the temporary pixel QS equal to the value of the γ nibble of the byte Q'. Control then jumps to step S1220. In step S1220, the image value of the 800 ppi pixel B is set based on the value of the α nibble of the bytes P' and Q', e.g., the α nibble values are averaged, and the image value of the 800 ppi pixel D is synthesized based on the image values of the 800 ppi pixel C and the temporary pixel QS, e.g., the image values of 800 ppi pixel C and temporary pixel QS are averaged. Control then jumps to step S1390.

In contrast, in step S1190 a determination is made whether the byte S' contains non-continuous tone data or continuous tone data. If step S1190 determines that the byte S' contains non-continuous tone data, control proceeds to step S1200. Otherwise, control jumps to step S1210.

In step S1200, the image value of the temporary pixel QS is set based on the value of the α nibble of the byte S' and the value of the α nibble of the byte Q', for example, the α nibble values are averaged. Control then proceeds to step S1220. As discussed above, in step S1220, the image value of the 800 ppi pixel B is set based on the α nibble values of the bytes P' and Q' and the image value of the 800 ppi pixel D is set based on the image values of the 800 ppi pixel C and the temporary pixel QS. Control then proceeds to step S1390.

In step S1210, the image value of the temporary pixel QS is set equal to the value of the α nibble of the byte Q'. Control then proceeds to step S1220. In step S1220, as described above, the image value of the 800 ppi pixel B is set based on the α nibble values of the bytes P' and Q' and the image value of the 800 ppi pixel D is set based on the image values of the 800 ppi pixel C and the temporary pixel QS. Control then proceeds to step S1390.

Figure 27E:
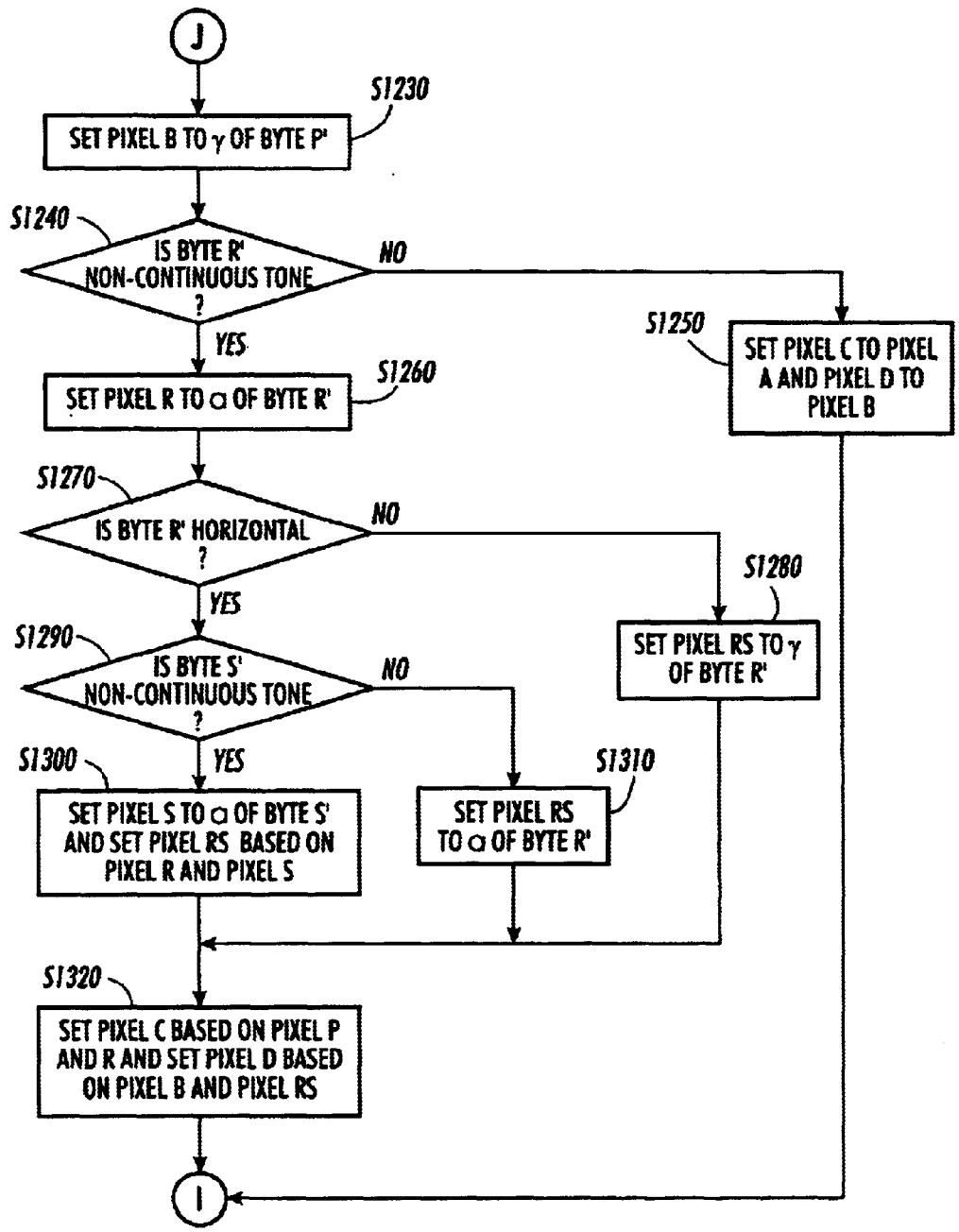

In step S1230, illustrated in FIG. 27(E), the image value of the 800 ppi pixel B is set equal to the value of the γ nibble of the byte P'. Control then proceeds to step S1240. In step 1240, a determination is made whether the byte R' contains non-continuous tone or continuous tone data. If the byte R' contains non-continuous tone, control proceeds to step S1260. Otherwise, control proceeds to step S1250.

In step S1250, the image value of the 800 ppi pixel C is set equal to the image value of the 800 ppi pixel A, and the image value of the 800 ppi pixel D is set equal to the image value of the 800 ppi pixel $B_1$ Control then proceeds to step S1390 illustrated in FIG. 27(A).

In step S1260, the image value of the temporary pixel R is set equal to the value of the α nibble of the byte R'. Control then proceeds to step S1270. In step S1270, a determination is made whether the direction bit $B_1$ of the byte R' indicates that the quadrant to be decompressed contains a horizontal or vertical edge. If, in step S1270, a determination is made that the quadrant contains a horizontal edge, control proceeds to step S1290. Otherwise, control proceeds to step S1280.

In step S1290, a determination is made whether the byte S' contains non-continuous tone data or continuous tone data. If the byte S' is determined to contain non-continuous tone data, control proceeds to step S1300. Otherwise, control proceeds to step S1310.

In step S1300, the image value of the temporary pixel S is set equal to the value of the α nibble of the byte S', while the image value of the temporary pixel RS is set based on the image value of the temporary pixel R and the temporary pixel S, e.g., the image values of the temporary pixels R and S are averaged. Control then proceeds to step S1320. In step S1320, the image value of the 800 ppi pixel C is set based on the image values of the temporary pixel P and the temporary pixel R, while the image value of the 800 ppi pixel D is set based on the image values of the 800 ppi pixel B and the temporary pixel RS. Control then proceeds to step S1390.

In step S1310, the image value of the temporary pixel RS is set equal to the value of the α nibble of the byte R'. Control then proceeds to step S1320. In step S1320, as discussed above, the image value of the 800 ppi pixel C is set based on the image values of the temporary pixels P and R, while the image value of the 800 ppi pixel D is set based on the image values of the 800 ppi pixel B and the temporary pixel RS, for example, the image values of the 800 ppi pixel B and the temporary pixel RS are averaged. Control then proceeds to step S1390, illustrated in FIG. 27(A).

In step S1280, the image value of the temporary pixel RS is set equal to the value of the γ nibble of the byte R'. Control then proceeds to step S1320. In step S1320, as set forth above, the image value of the 800 ppi pixel C is set based on the image values of the temporary pixels P and R, while the image value of the 800 ppi pixel D is set based on the image value of the 800 ppi pixel B and the image value of the temporary pixel RS. Control then proceeds to step S1390, illustrated in FIG. 27(A).

Figure 27F:
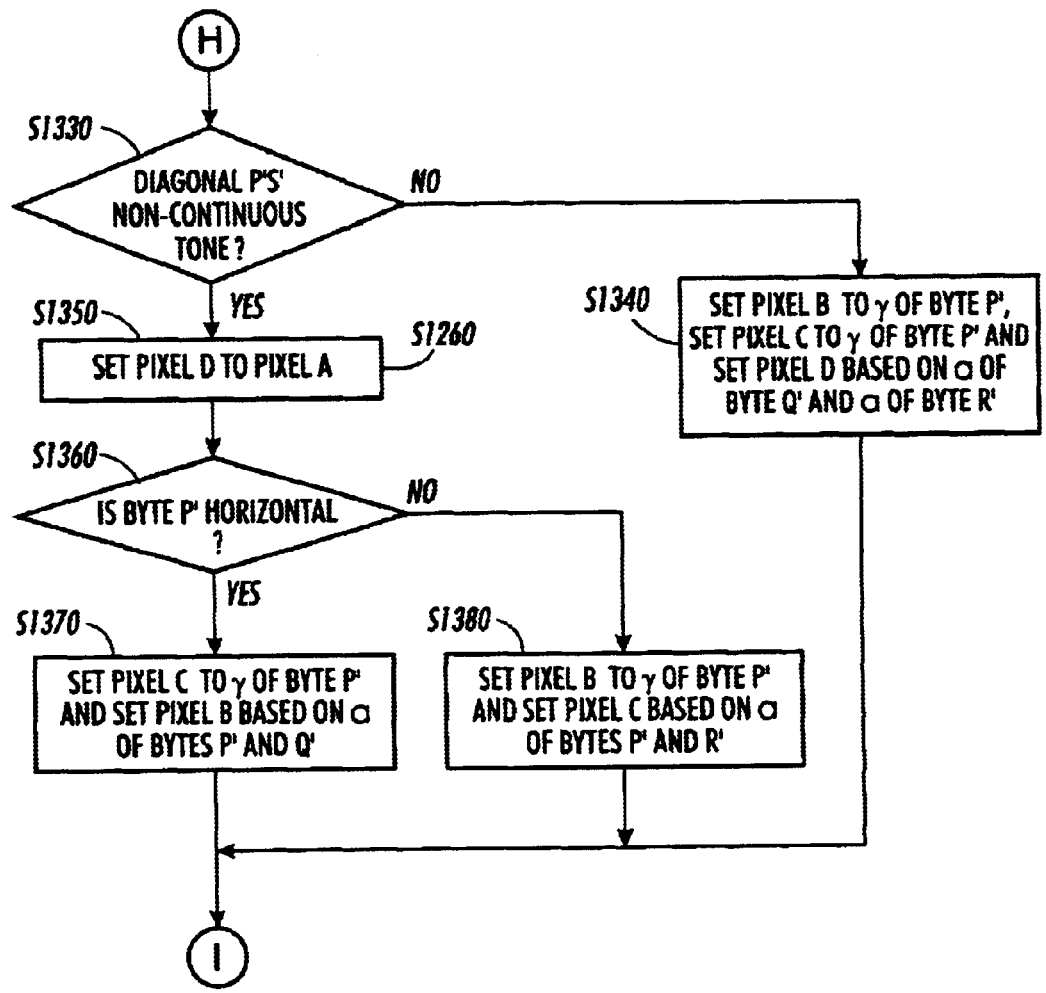

In step S1330, illustrated in FIG. 27(F), a determination is made whether the diagonal P'S' is non-continuous tone data. If the diagonal P'S' is determined to contain non-continuous tone data, control proceeds to step S1350. Otherwise, control proceeds to step S1340.

In step S1340, the image value of the 800 ppi pixel B is set equal to the value of the γ nibble of the byte P', the image value of the 800 ppi pixel C is set equal to the value of the γ nibble of the byte P', the image value of 800 ppi pixel D is set based on the values of the α nibbles of the bytes Q' and R', e.g., the values of the α nibbles are averaged. Control then proceeds to step S1390, illustrated in FIG. 27(A).

In step S1350, the image value of the 800 ppi pixel D is set equal to the image value of the 800 ppi pixel A, which was previously set to the value of the α nibble of the byte P'. The process then proceeds to step S1360. In step S1360, a determination is made whether the direction bit $B_1$ of the byte P' indicates that quadrant I contains a horizontal or vertical edge. If the quadrant I is determined to contain a horizontal edge, control proceeds to step S1370. Otherwise, control proceeds to step S1380.

In step S1370, the image value of the 800 ppi pixel C is set equal to the α nibble of the byte P', while the image value of the 800 ppi pixel B is set based on the values of the α nibbles of the bytes P' and Q', for example, averaging of the values of α nibbles of bytes P' and Q'. Control then proceeds to step S1390, illustrated in FIG. 27(A).

In step S1380, the image value of the 800 ppi pixel B is set equal to the value of the γ nibble of the byte P', while the image value of the 800 ppi pixel C is set based on the values of the α nibbles of the bytes P' and R', for example, by averaging the values of the α nibbles. Control then proceeds to step S1390.

In step S1390, a determination is made whether there is any more image data to be decompressed. If so, control continues to step S1400. Otherwise control jumps to step S1410. In step S1400, the pointers are incremented. Control then jumps to step S1020. In contrast, in step S1410, the decompression method ends.

Figure 28:
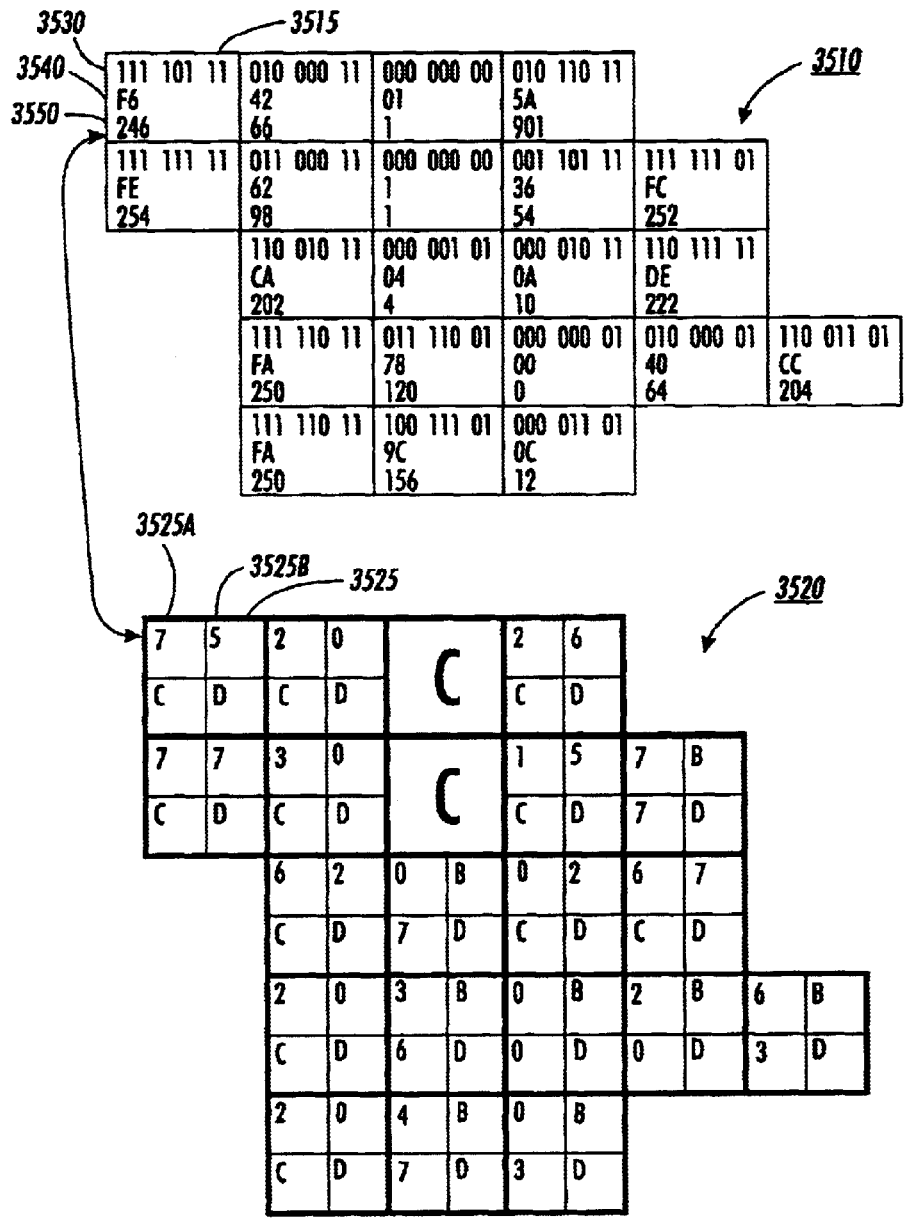
FIG. 28 is an illustrative example used to explain the operation of the exemplary embodiments of the systems and methods of this invention.

FIG. 28 illustrates one exemplary set of image data to be compressed and decompressed according to the exemplary embodiment of the compression and decompression systems and methods described above. FIG. 28 illustrates two set of image data: a top set of image data 3510 and a bottom set of image data 3520. Each set of image data corresponds to a bytemap. The set of image data 3510 corresponds to a bytemap of compressed data compressed using the above-described compression process. The set of image data 3520 is a bytemap resulting from decompression of set of image data 3510 following decompression by the above-described decompression process.

Set of compressed image data 3510 includes a plurality of blocks 3515. Each block 3515 represents the uncompressed image data corresponding to a byte of compressed data, which, in turn, corresponds to a quadrant of image data as illustrated in FIGS. 2–5 as quadrants I–IV. Therefore, the top row 3530 of each block 3515 represents the byte of compressed image data comprising an image value for the a nibble in the bits $B_7$–$B_5$, an image value for the γ nibble in the bits $B_4$–$B_2$, the direction bit $B_1$ indicative of the direction of an indicated edge within the quadrant and the segmentation bit $B_0$ indicative of whether the byte is continuous tone or non-continuous tone data. The middle row 3540 indicates the 8-bit value of bits $B_7$–$B_0$ in hexidecimal notation. The bottom row 3550 indicates the 8-bit value of bits $B_7$–$B_0$ in decimal notation.

In FIG. 28, when the segmentation bit $B_0$ is set to 1, the segmentation bit $B_0$ indicates a byte of compressed data containing non-continuous tone data. Analyzing the segmentation bit $B_0$ determines which of the decompression steps illustrated in FIGS. 27(A)–27(E) are performed. The set of image data 3520 includes a plurality of decompressed image data of blocks 3525. If a block 3525 contains non-continuous tone data, as indicated by a segmentation bit $B_0$ having a value of 1, the block 3525 includes two sections, 3525A and 3525B. If that block 3525 contains continuous tone data, as indicated by a C in FIG. 28, that block 3525 contains only one section. The locations of the sections 3525A and 3525B in each block 3525 depends on whether the direction bit of the corresponding byte of compressed data indicates a horizontal or a vertical edge. If the direction bit $B_1$ of a particular block 3525 indicates a vertical edge, then the two sections 3525A and 3525B are located horizontally next to each other. If the direction bit $B_1$ of a particular block 3525 indicates a horizontal edge then the two sections 3525A and 3525B are located vertically one on top of the other.

In FIG. 28, when the direction bit $B_1$ is set to 1, the direction bit $B_1$ indicates a vertical direction edge. Therefore, for any block 3515 of the set of image data 3510 containing a direction bit $B_1$ set to 1, the corresponding block 3525 of the set of decompressed image data 3520 contains a vertical edge. Alternatively, if the direction bit $B_1$ is not set to 1, the corresponding block 3525 contains a horizontal edge.

As discussed above, the byte of data illustrated in the top row 3530 of each block 3515 contains the values for the α and γ nibbles. As shown in the decompressed image data 3520, those values translate into the image values corresponding to the sections 3525A and 3525B, respectively. For instance, if the row 3530 of block 3515 in the compressed image data 3510 contains a bit segmentation bit $B_0$ set to 1, indicating non-continuous tone data, and bits $B_7$–$B_5$ set to 111 the image value for the α nibble is 7. Therefore, the image value for the corresponding section 3525A is 7. If that block also contains bits $B_6$–$B_4$ set to 101, the image value for the γ nibble is 5. Therefore, the image value of the corresponding section 3525B is 5. If the direction bit $B_1$ is set to 1, indicating a vertical edge, the sections 3525A and 3525B are located in the positions of the pixels A and B, respectively.

As discussed above, when rendering a vertical edge, high frequency spatial resolution is necessary in the horizontal direction. Therefore, the two nibbles of a byte corresponding to the sections 3525A and 3525B are used to provide the necessary data for determining the slope in the fast-scan direction to render a vertical edge with sub-scan precision. When rendering a horizontal edge, high frequency spatial resolution is necessary in the vertical direction. Therefore, the two nibbles of the byte corresponding to the sections 3525A and 3525B are used to provide the necessary bits for determining the slope in the slow-scan direction to render the horizontal edge with sub-scan precision.

The compression and decompression processes described above are data dependent, because the processes perform different steps depending on the character of the data, e.g., whether the image data is continuous tone or non-continuous tone data. The compression and decompression processes can be accomplished in real time by specialized hardware. For example, the compression and decompression processes may be performed by the processor described in U.S. Pat. No. 5,485,289, incorporated herein by reference in its entirety. Additionally, the processes may be performed by a processor used in conjunction with the architecture described in the incorporated '289 patent. Further, it is contemplated that separate processors may be used to perform the compression process and the decompression process and either/or both processes may be located separately from each other and the architecture in that patent.

It is further contemplated that any equipment used to discard data in FIG. 6 may be part of a compressor used within an encoder rather than separating the discarder and compressor.

Further, it is contemplated that the compression and decompression processes may use a bit word of any convenient length, e.g., a ten-bit word. The utility of the invention is not limited to compression and decompression processes using bytes of data. Compressing the bits into a byte is advantageous; however, a 10-bit word may be used instead of byte to provide further improves edge placement precision.

The compression and decompression processes and systems are preferably implemented on a programmed general purpose computer. Further, each of the components shown in FIGS. 6–8 can be implemented as portions of a suitably programmed general purpose computer. However, the compression and decompression processes and systems can also be implemented on a special purpose computer, a programmed microprocessor or microcontroller and peripheral integrated circuit logic elements, and ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is, in turn, capable of implementing the flowcharts shown in FIGS. 9(A)–27(F), can be used to implement the compression and decompression processes.

While this invention has been described in conjunction with the specific exemplary embodiments outlined above, it is evident that many alternatives, modifications and variations will be apparent to those skilled in the art. Accordingly, the preferred embodiments of the invention. as set forth above, are intended to be illustrative, not limiting. Various changes may be made without departing from the spirit and scope of the invention.

Appendix A

```
scnPtr = img + (S.yOfsM+S.yWinM-1)*pixPerScn + S.xOfsM;
if (levels==8) {
    if (S.segmntMode==3) { /* directed acuity mode 3; pack pixels */
        /* S.xWinM and S.yWinM known to be mod 8 & mod 2, respectively */
        for (j=0; j<S.yWinM; j+=2, scnPtr-=2*pixPerScn) {
            pxlPtr = scnPtr;
            for (i=0; i<S.xWinM; i+=2, pxlPtr+=2) {
                bA = (int)*pxlPtr;
                bB = (int)*(pxlPtr+1);
                bC = (int)*(pxlPtr-pixPerScn);
                bD = (int)*(pxlPtr-pixPerScn+1);
                /* bit 0 is set if halftone (&1) */
                /* bit 1 is set if verticle (&2) */
                /* code for diagionals is same value in 224 and 28 locs */
                /* diagionals made only when bit d is blacker than a,b,c */
                vector = 0;
                if (bA&1) vector |= 8; /* halftone A */
                if (bB&1) vector |= 4; /* halftone B */
                if (bC&1) vector |= 2; /* halftone C */
                if (bD&1) vector |= 1; /* halftone D */
                switch (vector) {
                    case 0:if/*(((bD&224)<(bB&224))&&((bD&224)<(bC&224)))*/(0) {
                               byt = (bD&227)|((bD>>3)&28); break;
                           } else {
                               byt = (bA&2)? (bA&227)|((bB>>3)&28)
                                           :(bA&227)|((bC>>3)&28);
                               byt = grad(byt); break;
                           }
                    case 1:    byt = (bA&2)? (bA&227)|((bB>>3)&28)
                                           :(bA&227)|((bC>>3)&28);
                               byt = grad(byt); break;
                    case 2:    byt = (bB&2)? (bA&224)|((bB>>3)&28)|(bB&3)
                                           :(bA&224)|m28(bA)|(bB&3);
                               byt = grad(byt); break;
                    case 3:    byt = (bA&2)? (bA&227)|((bB>>3)&28)
                                           :(bA&227)|m28(bA);
                               byt = grad(byt); break;
                    case 4:    byt = (bC&2)? (bA&224)|m28(bA)|(bC&3)
                                           :(bA&224)|((bC>>3)&28)|(bC&3);
                               byt = grad(byt); break;
                    case 5:    byt = (bA&2)? (bA&227)|m28(bA)
                                           :(bA&227)|((bC>>3)&28);
                               byt = grad(byt); break;
                    case 6:    byt =        bA&227|m28(bA); break;
                    case 7:    byt =        bA&227|m28(bA);
                               byt = grad(byt); break;
                    case 8:if/*(((bD&224)<(bB&224))&&((bD&224)<(bC&224)))*/(0) {
                               byt = (bD&227)|((bD>>3)&28); break;
                           } else {
                               byt = (bD&2)? m224(bC)|((bB>>3)&28)|(bD&3)
                                           :m224(bB)|((bC>>3)&28)|(bD&3);
                               byt = grad(byt); break;
                           }
                    case 9:    byt = (bB&2)? m224(bC)|((bB>>3)&28)|(bB&3)
                                           :m224(bB)|((bC>>3)&28)|(bB&3);
                               byt = grad(byt); break;
                    case 10:
                    case 11:   byt =        m224(bB)|((bB>>3)&28)|(2);
                               byt = grad(byt); break;
                    case 12:
                    case 13:   byt =        m224(bC)|((bC>>3)&28);
                               byt = grad(byt); break;
                    case 14:   byt =        (bD&227)|((bD>>3)&28); break;
                    case 15:   byt =        bA; break;
                }
                temp1 = (uch)byt;
                putc(temp1, stmPtr);/* even is lineart */
            }
        }
    } else { /* mode must be 0,1 or 2 */
        /* S.xWinM known to be mod 4 */
```

```
                for (j=0; j<S.yWinM; j++, scnPtr-=pixPerScn) {
                    pxlPtr = scnPtr;
                    for (i=0; i<S.xWinM; i++, pxlPtr++) {
                        temp1 = *pxlPtr;
                            putc(temp1, stmPtr); /* even is lineart */
                    }
                }
            }
        } else { /* dont do segmentation for quants less than 8 */
            /* quantize the value, then map into a byte, 0-255 */
            qdbl0 = (dbl)(1<<levels);
            qdbl1 = (qdbl0-.000001)/255.0;
            qdbl2 = 255.0/(qdbl0-1.0);
            /* S.xWinM known to be mod 4 */
            for (j=0; j<S.yWinM; j++, scnPtr-=pixPerScn) {
                pxlPtr = scnPtr;
                for (i=0; i<S.xWinM; i++, pxlPtr++) {
                    temp1 = *pxlPtr;
                    if ((temp1==255)||(temp1==0)) {
                            putc(temp1, stmPtr);
                    } else {
                        qdbl3 = (dbl)temp1;
                        qdbl4 = (floor(qdbl3*qdbl1))*qdbl2;
                        putc(((unsigned char)qdbl4), stmPtr);
                    }
                }
            }
        }
        fclose(stmPtr);
    }
}
int
grad(byte)
int byte;
{ return byte;
{ /* returns byte with entrys not equal; ie a gradient */
        int b1, b2, b3, b4, b5, vector;
        b1 = byte&224; b2 = (byte&28)<<3;
        if (!(b1==b2)) {
            return byte;
        } else {
            vector = B1>>5;
            switch (vector) {
                case 7: b3 = 24; break; /* 224 */
                case 6: b3 = 28; break; /* 192 */
                case 5: b3 = 24; break; /* 160 */
                case 4: b3 = 20; break; /* 128 */
                case 3: b3 = 16; break; /* 96 */
                case 2: b3 = 4; break; /* 64 */
                case 1: b3 = 0; break; /* 32 */
                case 0: b3 = 4; break; /* 0 */
            }
            b4 = byte&3;
            b5 = b1|b3|b4
            return b5;
        }
}
int
m28 (byte)
int byte;
{
        if (byte&128) return 28; else return 0;
}
int
m224 (byte)
int byte;
{
        if (byte&128) return 224; else return 0;
}
```

Appendix B

```
if (mode==3) { /* disassemble das bytes into a,b,c,d pixels */
    srcPtr = srcStrt;
    ofsPtr = srcStrt + xwin*2; /* offset by one raster */
    nxtPtr = srcStrt + xwin*4; /* offset by two rasters */
    lstPtr = srcStrt - xwin*4; /* offset by two rasters */
    for (i=0; i<ywin; i++) {
        for (j=0; j<xwin; j++) {
            byteP = *srcPtr;
```

```
byteQ = *(srcPtr+2);
byteR = *nxtPtr;
byteS = *(nxtPtr+2);
byteU = *lstPtr; /* U & V have been unpacked last raster */
byteV = *(srcPtr-2);
crnrP = *(lstPtr-2);
crnrQ = *(lstPtr+2);
crnrR = *(nxtPtr-2);
crnrS = *(nxtPtr+2);
dglPS = ((crnrP&1)&&(crnrS&1)); /* both PS corners lineart */
dglQR = ((crnrQ&1)&&(crnrR&1)); /* both QR corners lineart */
/* lsb indicates lineart; next lsb indicates horizontal */
if (byteP&1) { /* p is lineart - gen pqrs as lineart pixels */
    tmpp = (byteP&224);
    pxlp = tmpp|(tmpp>>3);
    if( ((byteQ&2)(byteR&2))    /* one vert, the other horz */
        &&(byteQ&1)&&(byteR&1)    /* and both sides are lineart */
        &&(byteU&1)&&(byteV&1)    /* and four sides are lineart */
        &&((dglPS) || (dglQR)) ) { /* and either ps or qr lineart */
    /* if both diags lineart, replicate lowest along diag. */
    /* if only one diag lineart, replicate in dir of diag. */
    pxla = pxlp|1;
    tbot = byteP&28;
    pbot = tbot|(tbot<<3)|1;
    if ((dglPS)&&(dglQR)) { /* both diagionals lineart */
        /* replicate the lowest */
        if (pxla<pbot) { /* replicate a to d; b or c intorpolated */
            pxld = pxla;
            if (byteP&2) { /* p horz; bot of p goes to c; b intrp */
                tmpq = (byteQ&224);
                pxlq = tmpq|(tmpq>>3);
                    pxlb = ((pxlp+pxlq)/2)|1;
                    pxlc = pbot;
            } else { /* p vert; bot of p goes to b; c intrp */
                tmpr = (byteR&224);
                pxlr = tmpr|(tmpr>>3);
                    pxlc = ((pxlp+pxlr)/2)|1;
                    pxlb = pbot;
            }
        } else { /* replicate b to c; d intorpolated */
            pxlb = pbot;
            pxlc = pbot;
            tmpq = (byteQ&224);
            pxlq = tmpq|(tmpq>>3);
            tmpr = (byteR&224);
            pxlr = tmpr|(tmpr>>3);
            pxld = ((pxlq+pxlr)/2)|1;
        }
    } else { /* only one diagonal PS or QR is lineart */
        if (dglPS) { /* only diagonal PS is lineart */
            /* replicate along PS direction */
            pxld = pxla;
            if (byteP&2) { /* p is horz */
                    pxlc = pbot;
                tmpq = (byteQ&224);
                pxlq = tmpq|(tmpq>>3);
                    pxlb = ((pxlp+pxlq)/2)|1;
            } else { /* p is vert */
                    pxlb = pbot;
                tmpr = (byteR&224);
                pxlr = tmpr|(tmpr>>3);
                    pxlc = ((pxlp+pxlr)/2)|1;
            }
        } else { /* only diagonal QR is lineart */
            /* replicate along QR direction */
            pxlb = pbot;
            pxlc = pbot;
            tmpq = (byteQ&224);
            pxlq = tmpq|(tmpq>>3);
            tmpr = (byteR&224);
            pxlr = tmpr|(tmpr>>3);
            pxld = ((pxlq+pxlr)/2)|1;
        }
    }
    i=i; /* breakpoint */
} else {
    pxla = pxlp|1;
    if (byteP&2) { /* p is horz */
        tmpc = byteP&28;
```

-continued

```
                                pxlc = tmpc|(tmpc<<3)|1;
                                if (byteQ&1) { /* q is lineart */
                                    tmpq = (byteQ&224);
                                    pxlq = tmpq|(tmpq>>3);
                                    if (byteQ&2) { /* q is horz */
                                        tmqs = byteQ&28;
                                        pxqs = tmqs|(tmqs<<3);
                                    } else { /* q is verticle */
                                        if (byteS&1) { /* s is lineart */
                                            tmps = (byteS&224);
                                            pxls = tmps|(tmps>>3);
                                            pxqs = (pxlq+pxls)/2;
                                        } else { /* s is halftone */
                                            pxqs = pxlq;
                                        }
                                    }
                                    pxlb = ((pxlp+pxlq)/2)|1;
                                    pxld = ((pxlc+pxqs)/2)|1;
                                } else { /* q is halftone */
                                    pxlb = pxla;
                                    pxld = pxlc;
                                }
                            } else { /* p is vert */
                                tmpb = byteP&28;
                                pxlb = tmpb|(tmpb<<3)|1;
                                if (byteR&1) { /* r is lineart */
                                    tmpr = (byteR&224);
                                    pxlr = tmpr|(tmpr>>3);
                                    if (byteR&2) { /* r is horz */
                                        if (byteS&1) { /* s is lineart */
                                            tmps = (byteS&224);
                                            pxls = tmps|(tmps>>3);
                                            pxrs = (pxlr+pxls)/2;
                                        } else { /* s is halftone */
                                            pxrs = pxlr;
                                        }
                                    } else { /* r is verticle */
                                        tmrs = byteR&28;
                                        pxrs = tmrs|(tmrs<<3);
                                    }
                                    pxlc = ((pxlp+pxlr)/2)|1;
                                    pxld = ((pxlb+pxrs)/2)|1;
                                } else { /* r is halftone */
                                    pxlc = pxla;
                                    pxld = pxlb;
                                }
                            }
                        }
                    } else { /* p is halftone - generate pqrs as halftone pixels */
                        pxlp =                     byteP&254;
                        pxlq = (byteQ&1)? pxlp : byteQ&254; /* q lineart? */
                        pxlr = (byteR&1)? pxlp : byteR&254; /* r lineart? */
                        pxls = (byteS&1)? pxlp : byteS&254; /* s lineart? */
                        pxla = pxlp;
                        pxlb = ((pxlp+pxlq)/2);
                        pxlc = ((pxlp+pxlr)/2);
                        pxld = ((pxlp+pxlq+pxlr+pxls)/4);
                    }
                                *(srcPtr+0) = (uch)pxla;
                                *(srcPtr+1) = (uch)pxlb;
                                *(ofsPtr+0) = (uch)pxlc;
                                *(ofsPtr+1) = (uch)pxld;
                                srcPtr += 2; /* advance by one source pixel */
                                ofsPtr += 2; /* advance by one source pixel */
                                nxtPtr += 2; /* advance by one source pixel */
                                lstPtr += 2; /* advance by one source pixel */
                    }
                    srcPtr += xwin*2; /* advance by one more source raster */
                    ofsPtr += xwin*2; /* advance by one more source raster */
                    nxtPtr += xwin*2; /* advance by one more source raster */
                    lstPtr += xwin*2; /* advance by one more source raster */
                }
            }
        }
```

What is claimed is:

1. A process for compressing and decompressing image data representing a plurality of pixels and represented by a plurality of bitwords, each pixel corresponding to a separate bitword, the process comprising:

discarding a quantity of bitwords along a direction of an edge while keeping bitwords across the direction of the edge;

compressing data indicative of a plurality of explicit pixels remaining after the discarding step into a single compressed-data-bitword;

decompressing data from the compressed-data-bitword to provide data indicative of the plurality of explicit pixels; and synthesizing data from the decompressed-data-bitword to provide data corresponding to a synthesized pixel.

2. The process of claim 1, wherein the step of compressing includes reducing a quantity of bits necessary to represent non-continuous tone data.

3. The process of claim 1, wherein the discarded quantity of bitwords is half of the bitwords in the plurality of bitwords.

4. The process of claim 1, wherein the quantity of discarded bitwords includes half of the bitwords corresponding to non-continuous tone data in the plurality of bitwords.

5. The process of claim 1, wherein the quantity of discarded bitwords includes three-quarters of the bytes corresponding to continuous tone data in the plurality of bitwords.

6. The process of claim 1, wherein the step of compressing data indicative of the plurality of explicit pixels remaining after the discarding step into the single compressed-data-bitword is performed on pixels that contain non-continuous tone data.

7. The process of claim 1, wherein the step of compressing includes maintaining any bitwords indicative of continuous tone data so that each pixel of continuous tone data corresponds to a separate bitword of the plurality of bitwords.

8. The process of claim 1, wherein discarding the quantity of bitwords produces low spatial resolution data corresponding to continuous tone data and high spatial resolution data corresponding to non-continuous tone data.

9. The process of claim 1, wherein following compression, a quantity of compressed non-continuous tone data is decreased to approximately a quarter of a quantity of uncompressed non-continuous tone data present in the plurality of bitwords representing the plurality of pixels.

10. The process of claim 1, wherein during decompression, non-continuous tone data with a high spatial resolution in one dimension is decompressed into a high spatial resolution bitword-map with reference to information indicating a direction of an edge within the image data.

11. The process of claim 1, wherein during decompression, continuous tone data with a low spatial resolution is processed to provide a low spatial resolution bitword-map.

12. The process of claim 11, wherein during decompression, bitwords of information corresponding to discarded non-continuous tone data are synthesized.

13. The process of claim 1, wherein discarding the quantity of bitwords includes discarding three-quarters of the bitwords corresponding to continuous tone data in a high spatial resolution bitword-map to produce low spatial resolution continuous tone data.

14. The process of claim 1, wherein discarding the quantity of bitwords includes discarding half of the bitwords corresponding to non-continuous tone data in one direction of the image data contained in the high spatial resolution bitword-map.

15. The process of claim 14, wherein discarding the quantity of bitwords comprises discarding half of the bitwords corresponding to non-continuous tone data so that resolution is stored in a direction perpendicular to an edge and resolution is discarded in a direction parallel to the edge.

16. The process of claim 14, wherein discarding the quantity of bitwords produces low spatial resolution data corresponding to continuous tone data and high spatial resolution data corresponding to non-continuous tone data.

17. The process of claim 1, wherein each of the bitwords are bytes.

18. The process of claim 17, wherein compressing data indicative of the plurality of explicit pixels remaining after the discarding step into a single bitword comprises:

converting a value indicative of a first pixel from a seven bit value to a three-bit value;

converting a value indicative of a second pixel from a seven bit value to a three-bit value;

establishing a direction bit indicating a direction of an edge located in spaced relationship to the first and second pixels; and establishing a segmentation bit indicating that the bitword contains non-continuous tone data.

19. The process of claim 18, wherein decompressing the data from the compressed bitword comprises:

referencing the segmentation bit of the bitword to determine whether the bitword contains non-continuous tone data;

referencing the direction bit to determine whether the direction of the edge located in spaced relationship to the first and second pixels;

referencing the three-bit value indicative of the first pixel; and referencing the three-bit value indicative of the second pixel.

20. The process of claim 18, wherein the direction bit indicates a direction of synthesis to be performed using the data contained in the decompressed-data-bitword.

21. The process of claim 20, wherein the step of synthesizing is performed in either a fastscan direction or a slowscan direction based on the direction bit.

22. The process of claim 21, wherein the direction bit defines sufficient information for determining which pixel positions are to be synthesized during decompression.

23. The process of claim 22, further comprising rendering twice as many pixels in a direction perpendicular to an edge indicated by the direction bit.

24. The process of claim 22, wherein, when the direction bit indicates a vertical edge, high frequency spatial resolution is performed in the vertical direction by using the three-bit value associated with the first pixel and the three-bit value associated with the second pixel in the compressed-data-bitword to determine slope in the fast scan direction to render the vertical edge.

25. The process of claim 22, wherein, when the direction bit indicates a horizontal edge, high frequency spatial resolution is performed in the horizontal direction by using the three-bit value associated with the first pixel and the three-bit value associated with the second pixel in the byte of compressed data to determine slope in the slow scan direction to render the horizontal edge.

26. An image data compression and decompression process comprising:
discarding every other pixel in an image, each pixel being indicated by a single byte of data within a bytemap;
reducing the number of bits necessary to render non-continuous tone data pixels;
compressing the data necessary to render two pixels of non-continuous tone data into a single byte of compressed data; and
decompressing the single byte of compressed data to produce four pixels of non-continuous tone data.

27. The process of claim 26, further comprising, following compression, transmitting the byte of compressed data to a print engine where the step of decompressing is performed, the step of decompressing including extracting the data necessary to render the two non-continuous tone data pixels and fabricating two more non-continuous tone data pixels in a low-spatial resolution direction based on the values of the extracted data.

28. A compression and decompression system for compressing and decompressing image data, the system comprising:
a compressor that compresses image data represented in a bitword-map based on a type of data contained in regions of the bitword-map to produce a compressed-data-bitword-map, wherein the compressor processes the bitword-map to provide both low spatial resolution continuous tone data and to provide high spatial resolution non-continuous tone data, the high spatial resolution non-continuous tone data being provided by storage of extra resolution across edges of marks within an image corresponding to the image data; and
a decompressor that decompresses the compressed-data-bitword-map to provide high spatial resolution data containing non-continuous tone data using the extra resolution across the edges of the marks, and the decompressor decompresses the compressed data bitword-map to provide low spatial resolution continuous tone data.

29. An image forming device, including the compression and decompression system of claim 28.

30. The image forming device of claim 29, wherein the image forming device is a facsimile machine, a laser printer, an inkjet printer, a digital copier or a full-width-print bar printer.

31. A method for compressing image data representing a plurality of pixels and represented by a plurality of bitwords, each pixel corresponding to a separate bitword, the method comprising:
discarding a quantity of bitwords along a direction of an edge while keeping bitwords across the direction of the edge; and
compressing data indicative of a plurality of explicit pixels remaining after the discarding step into a single compressed-data-bitword.

32. The method of claim 31, wherein compressing the data includes reducing a quantity of bits necessary to represent non-continuous tone data.

33. The method of claim 31, wherein discarding the quantity of bitwords comprises discarding half of the bitwords in the plurality of bitwords.

34. The method of claim 31, wherein discarding the quantity of bitwords comprises discarding half of the bitwords corresponding to non-continuous tone data in the plurality of bitwords.

35. The method of claim 31, wherein discarding the quantity of bitwords comprises discarding three-quarters of the bytes corresponding to continuous tone data in the plurality of bitwords.

36. The method of claim 31, wherein the compressing the data indicative of the plurality of explicit pixels remaining after the discarding step into the single compressed-data-bitword comprises compressing data corresponding only to pixels that contain non-continuous tone data.

37. The method of claim 31, wherein compressing the data includes not compressing any bitwords indicative of continuous tone data so that each pixel of continuous tone data corresponds to a separate bitword of the plurality of bitwords.

38. The method of claim 31, wherein discarding the quantity of bitwords produces low spatial resolution data corresponding to continuous tone data and high spatial resolution data corresponding to non-continuous tone data.

39. The method of claim 31, wherein decreasing a quantity of compressed non-continuous tone data to approximately a quarter of a quantity of uncompressed non-continuous tone data present in the plurality of bitwords representing the plurality of pixels.

40. The method of claim 31, wherein discarding the quantity of bitwords comprises discarding three-quarters of the bitwords corresponding to continuous tone data in a high spatial resolution bitword-map to produce low spatial resolution continuous tone data.

41. The method of claim 31, wherein discarding the quantity of bitwords includes discarding half of the bitwords corresponding to non-continuous tone data in one direction of the image data contained in the high spatial resolution bitword-map.

42. The method of claim 31, wherein discarding the quantity of bitwords comprises discarding half of the bitwords corresponding to non-continuous tone data so that resolution is maintained in a direction perpendicular to an edge and resolution is reduced in a direction parallel to the edge.

43. The method of claim 31, wherein discarding the quantity of bitwords produces low spatial resolution data corresponding to continuous tone data and high spatial resolution data corresponding to non-continuous tone data.

44. The method of claim 31, wherein each of the bitwords are bytes.

45. The method of claim 44, wherein compressing data indicative of the plurality of explicit pixels after the discarding step into a single bitword comprises:
converting a value indicative of a first pixel from a seven bit value to a three-bit value;
converting a value indicative of a second pixel from a seven bit value to a three-bit value;
establishing a direction bit indicating a direction of an edge located in spaced relationship to a first and second pixels; and
establishing a segmentation bit indicating that the bitword contains non-continuous tone data.

46. The method of claim 45, therein the direction bit indicates a direction of synthesis to be performed using the data contained in the decompressed-data-bitword.

47. An image data compression method comprising:
discarding every other pixel in an image, each pixel being indicated by a single byte of data within a bytemap;
reducing the number of bits necessary to render non-continuous tone data pixels; and
compressing the data necessary to render two pixels of non-continuous tone data into a single byte of compressed data.

48. A compression system for compressing image data, the system comprising:

a compressor that compresses image data represented in a bitword-map based on a type of data contained in regions of the bitword-map to produce a compressed-data-bitword-map, wherein the compressor processes the bitword-map to provide both low spatial resolution continuous tone data and to provide high spatial resolution non-continuous tone data, the high spatial resolution non-continuous tone data being provided by storage of extra resolution across edges of marks within an image corresponding to the image data.

* * * * *